US012794825B2

(12) United States Patent
Evens et al.

(10) Patent No.: US 12,794,825 B2
(45) Date of Patent: Nov. 10, 2026

(54) HIGH PERFORMANCE TIME-BASED QUEUE

(71) Applicant: Cisco Technology, Inc., San Jose, CA (US)

(72) Inventors: Tim Evens, Bainbridge Island, WA (US); Tomas A. Rigaux, Victoria (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/511,371

(22) Filed: Nov. 16, 2023

(65) Prior Publication Data

US 2025/0030643 A1 Jan. 23, 2025

Related U.S. Application Data

(60) Provisional application No. 63/513,959, filed on Jul. 17, 2023.

(51) Int. Cl.

*H04L 47/56* (2022.01)
*H04L 47/62* (2022.01)
*H04L 47/625* (2022.01)

(52) U.S. Cl.

CPC ........ *H04L 47/564* (2013.01); *H04L 47/6235* (2013.01); *H04L 47/626* (2013.01)

(58) Field of Classification Search

CPC ..... H04L 47/50; H04L 47/286; H04L 47/564; H04L 47/626; H04L 63/1416; H04L 47/6235; H04L 43/0864; H04L 1/188; H04L 1/1874; H04L 43/106; H04L 69/28; H04L 1/1887; H04L 47/28;

(Continued)

(56) References Cited

U.S. PATENT DOCUMENTS 7,096,272 B1 * 8/2006 Raman .................. H04L 65/765 709/231
7,813,348 B1 10/2010 Gupta et al.

(Continued)

OTHER PUBLICATIONS

International Search Report and Written Opinion for International Application No. PCT/US2024/037463, mailed Oct. 14, 2024, 15 Pages.

*Primary Examiner* — Tonia L Dollinger
*Assistant Examiner* — Linh T. Nguyen
(74) *Attorney, Agent, or Firm* — Rutan & Tucker, LLP; Ravi Mohan; Marc A. McClain

(57) ABSTRACT

Devices, networks, systems, methods, and processes for utilizing a time-based queue are described herein. A device may receive an object stream comprising multiple objects. The device may assign a Time-To-Live (TTL) value for each object in the object stream and a maximum TTL value for the object stream. The device may create and store the time-based queue in a memory based on the maximum TTL value. The device may insert the objects in the time-based queue at corresponding object insertion times. The device can pop the objects out of the time-based queue in First-In-First-Out (FIFO) order. The objects may expire when time periods indicated by corresponding TTL values elapse after the corresponding object insertion times. The device can further remove the expired objects from the time-based queue. The time-based queue stored in the memory can include references to the objects stored in a time-based storage in form of an array.

20 Claims, 11 Drawing Sheets

(58) Field of Classification Search
CPC ..... H04L 65/1083; H04L 45/22; H04L 45/00; H04L 45/28; H04L 45/03; H04L 45/70; H04L 67/568; H04L 45/20
See application file for complete search history.

(56) References Cited

U.S. PATENT DOCUMENTS

| | | | | |
|---|---|---|---|---|
| 8,902,765 | B1 * | 12/2014 | Wang | H04L 47/32 370/252 |
| 2002/0071387 | A1 * | 6/2002 | Horiguchi | H04L 47/22 370/412 |
| 2002/0150115 | A1 * | 10/2002 | Onvural | H04L 49/3081 370/411 |
| 2004/0071096 | A1 * | 4/2004 | Na | H04L 1/0029 370/252 |
| 2004/0252693 | A1 * | 12/2004 | Cheriton | H04L 45/00 370/395.1 |
| 2007/0013948 | A1 | 1/2007 | Bevan | |
| 2007/0147394 | A1 * | 6/2007 | Wilkinson | G06F 1/14 370/398 |
| 2008/0077720 | A1 * | 3/2008 | Fanning | G06F 13/1642 710/240 |
| 2010/0202295 | A1 | 8/2010 | Smith et al. | |
| 2010/0261492 | A1 * | 10/2010 | Salafia | H04L 51/226 455/466 |
| 2011/0021218 | A1 | 1/2011 | Neil et al. | |
| 2011/0222400 | A1 | 9/2011 | Skoog et al. | |
| 2014/0146666 | A1 * | 5/2014 | Kwan | H04L 47/12 370/230 |
| 2015/0244635 | A1 * | 8/2015 | Orten | H04L 67/12 370/230 |
| 2016/0142343 | A1 * | 5/2016 | Tongle | H04L 69/22 370/474 |
| 2017/0011327 | A1 | 1/2017 | Mantri et al. | |
| 2019/0140966 | A1 * | 5/2019 | Geffen | H04W 28/0278 |
| 2019/0215107 | A1 * | 7/2019 | Lida | H04L 1/0007 |
| 2020/0034316 | A1 * | 1/2020 | Jung | G06F 9/4818 |
| 2021/0021563 | A1 | 1/2021 | Hegde | |
| 2024/0056385 | A1 * | 2/2024 | Bataineh | H04L 47/76 |
| 2024/0314218 | A1 * | 9/2024 | Gupta | G06F 16/9574 |
| 2024/0333784 | A1 * | 10/2024 | Reznik | H04L 65/612 |

* cited by examiner

FIG. 1
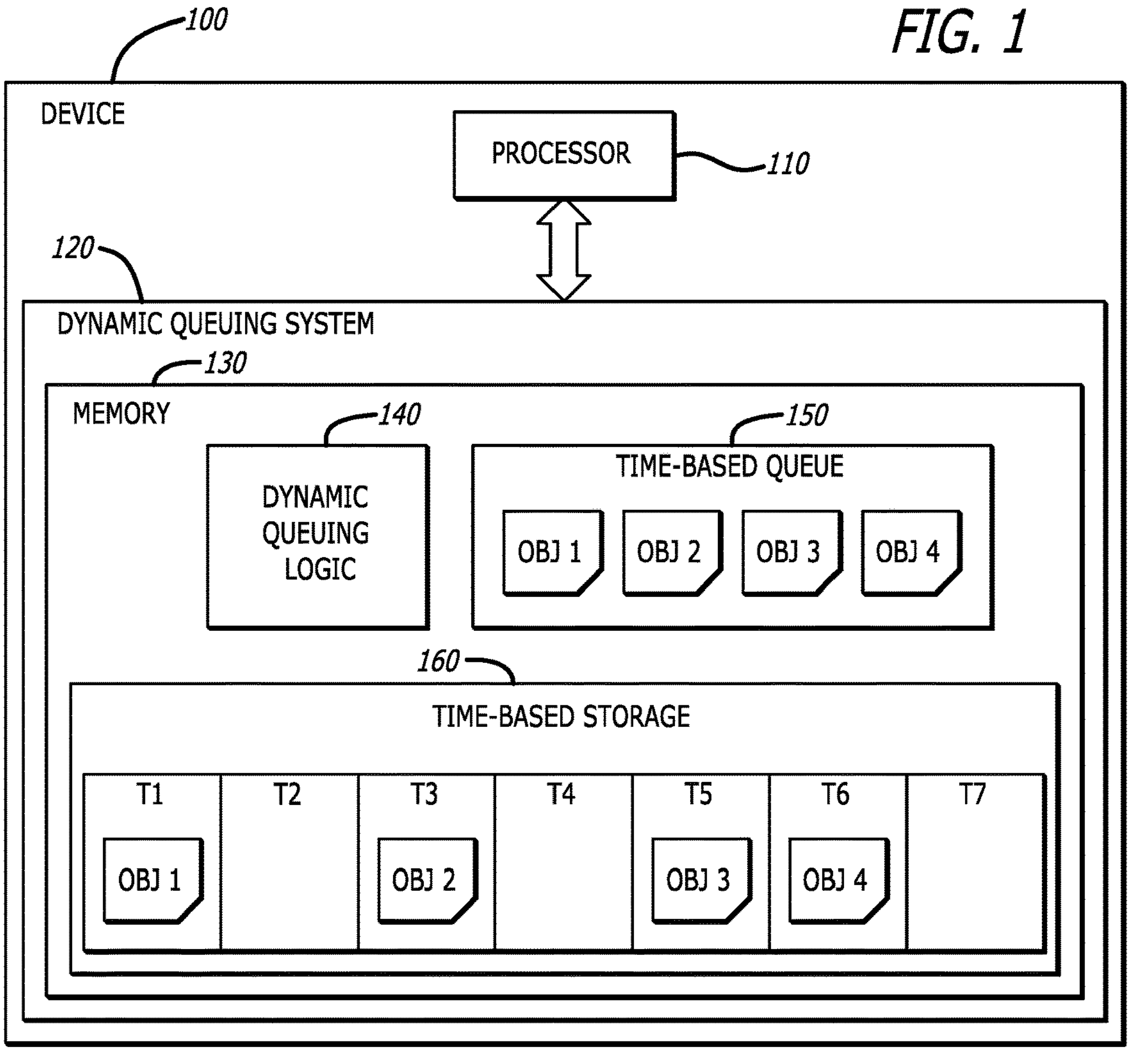
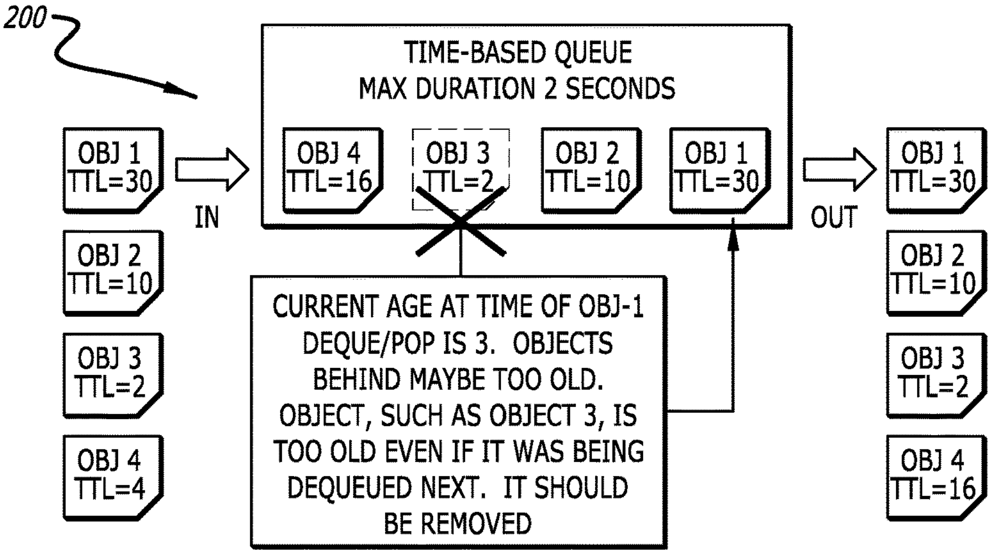
FIG. 2

HIGH PERFORMANCE TIME-BASED QUEUE

The present disclosure relates to digital networks. More particularly, the present disclosure relates to a time-based queue utilized in a digital network. This application claims priority to U.S. Provisional Patent Application Ser. No. 63/513,959 filed Jul. 17, 2023, which is incorporated by reference in its entirety.

BACKGROUND

Traditional queues or buffers represent a sequential data structure that generally follows a First-In-First-Out (FIFO) framework. When a new element enters the queue, it is placed at the rear of the queue, and the elements already present in the queue maintain their order. As elements are retrieved or processed from the front, the subsequent elements move up, maintaining the original sequence. This structure allows for a fair and orderly process, where the first element to enter the queue is the first to leave, ensuring a reliable and predictable arrangement of data. The objects are generally inserted and popped out in order. When queues reach full capacity, the objects are blocked or dropped.

Some queue implementations utilize a circular queue. In a circular queue, new elements are added at the end and, once the queue is full, it begins to wrap around and overwrite the oldest elements at the beginning of the queue. This process allows for efficient use of memory but can result in the loss of older data as new elements are added. Traditional queues, regardless of fixed or circular capacity, lock in what is queued. In other words, once in queue, the element must be popped to be removed. If the pop or dequeue operation is delayed, the queue causes drops and increases latency.

When an interactive media network communication uses a FIFO queue, for example, received frames or segments are stored in a buffer in the order they arrive and are processed sequentially. If the queue is not managed carefully, older frames/segments may remain in the queue for too long and eventually be discarded to make room for newer incoming data. This can result in the loss of important information or disrupt the continuity of the video/audio stream, leading to a degraded user experience that includes a slow or fast forward motion effect with significant delay in audio or video synchronization. Traditional queues or buffers also fail to consider time with respect to the objects and if the object should be dropped or transmitted during times of congestion.

SUMMARY OF THE DISCLOSURE

Systems and methods for a time-based queue utilized in a digital network in accordance with embodiments of the disclosure are described herein. In some embodiments, a device includes a processor, a memory communicatively coupled to the processor, and a dynamic queuing logic. The logic is configured to receive an object stream including a plurality of objects, determine a maximum Time-To-Live (TTL) value for the object stream, generate a time-based queue based on the maximum TTL value, assign a first TTL value for a first object of the plurality of objects, and insert the first object into the time-based queue.

In some embodiments, the dynamic queuing logic is further configured to determine a first object insertion time.

In some embodiments, the insertion of the first object occurs at the first object insertion time.

In some embodiments, the first TTL value is indicative of a first time period.

In some embodiments, the dynamic queuing logic is further configured to remove the first object from the time-based queue when the first time period has elapsed after the first object insertion time.

In some embodiments, the dynamic queuing logic is further configured to determine a second TTL value corresponding to a second object of the plurality of objects stored in the time-based queue, determine a second time period indicated by the second TTL value, determine a second object insertion time corresponding to the second object, and remove the second object from the time-based queue when the second time period has elapsed after the second object insertion time.

In some embodiments, the dynamic queuing logic is further configured to detect a latency spike in reception of the object stream, determine a recovery time period based on the latency spike, determine one or more objects of the plurality of objects having one or more TTL values within the recovery time period, and maintain the one or more objects of the plurality of objects in the time-based queue during the recovery time period.

In some embodiments, the dynamic queuing logic is further configured to retrieve the plurality of objects from the time-based queue based on a First-In-First-Out (FIFO) order and a plurality of TTL values corresponding to the plurality of objects.

In some embodiments, the dynamic queuing logic is further configured to determine a queue size based on the maximum TTL value, generate the time-based queue based on the queue size, and store the time-based queue in the memory.

In some embodiments, the time-based queue stores a plurality of references corresponding to the plurality of objects.

In some embodiments, the plurality of references correspond to a plurality of memory locations in the memory.

In some embodiments, the plurality of objects are stored in the plurality of memory locations in a bucket array.

In some embodiments, the bucket array is indexed based on the plurality of TTL values.

In some embodiments, the dynamic queuing logic is further configured to dynamically modify one or more TTL values of the plurality of TTL values corresponding to one or more objects of the plurality of objects stored in the time-based queue.

In some embodiments, the dynamic queuing logic is further configured to dynamically modify the maximum TTL value.

In some embodiments, a device includes a processor, a memory communicatively coupled to the processor, and a dynamic queuing logic, configured to receive an object stream including a plurality of objects, determine a maximum Time-To-Live (TTL) value for the object stream, generate a time-based queue based on the maximum TTL value, assign a plurality of TTL values for the plurality of objects, and insert the plurality of objects into the time-based queue.

In some embodiments, the dynamic queuing logic is further configured to determine a plurality of time periods corresponding to the plurality of TTL values, and remove one or more objects of the plurality of objects from the time-based queue based on one or more time periods of the plurality of time periods.

In some embodiments, the dynamic queuing logic is further configured to detect a latency spike in reception of the object stream, determine a recovery time period based on the latency spike, determine the one or more objects of the plurality of objects having one or more TTL values of the plurality of TTL values within the recovery time period, and maintain the one or more objects of the plurality of objects in the time-based queue during the recovery time period.

In some embodiments, a method includes receiving an object stream including a plurality of objects, determining a maximum Time-To-Live (TTL) value for the object stream, generating a time-based queue based on the maximum TTL value, assigning a plurality of TTL values for the plurality of objects, and inserting the plurality of objects into the time-based queue.

In some embodiments, the method further includes determining a plurality of time periods corresponding to the plurality of TTL values, and removing one or more objects of the plurality of objects from the time-based queue based on one or more time periods of the plurality of time periods.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 1 is a schematic block diagram of a device, in accordance with various embodiments of the disclosure;

FIG. 2 is a conceptual illustration of a time-based queue, in accordance with various embodiments of the disclosure;

Figure 3:
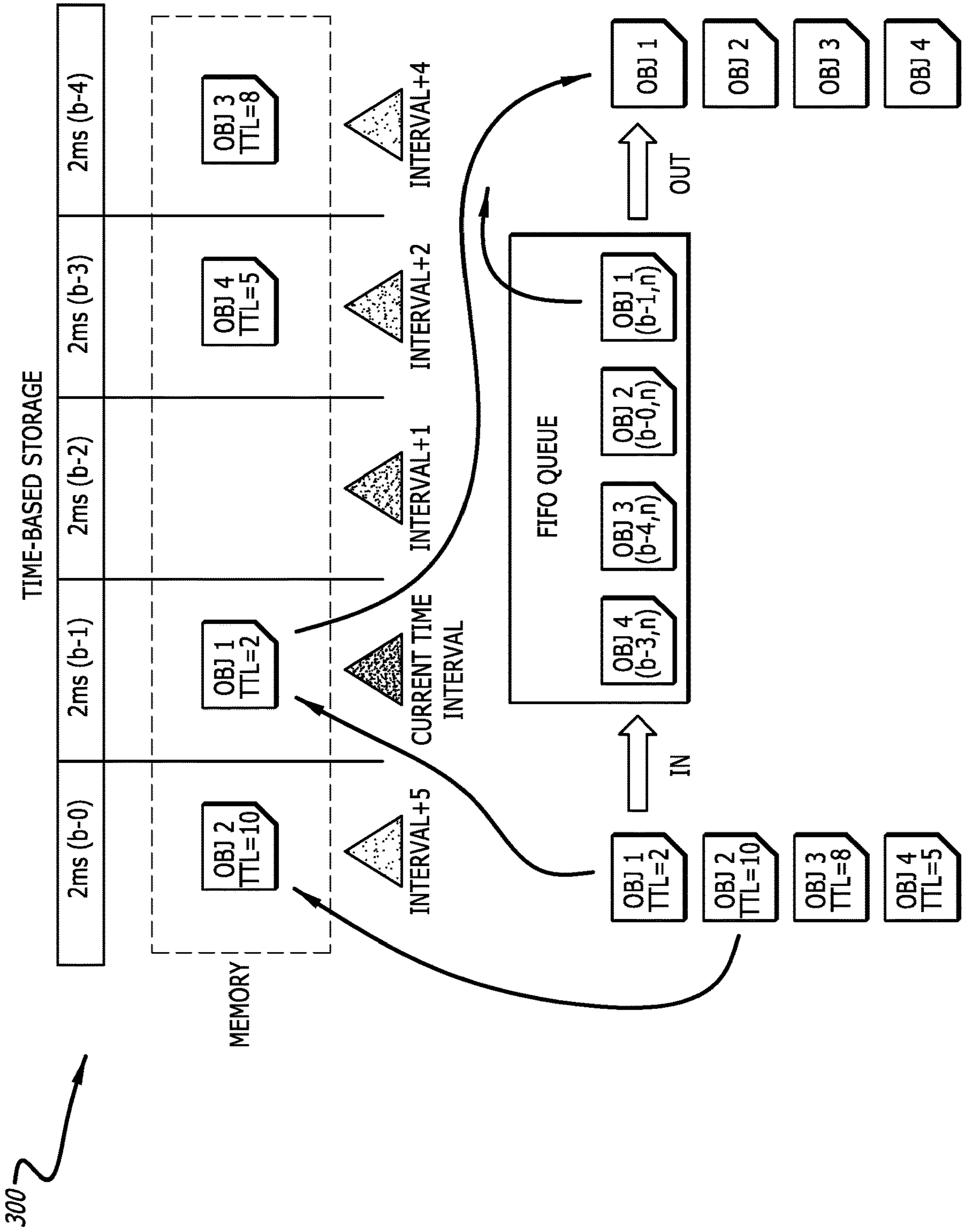
FIG. 3 is a conceptual illustration of maintaining receive to transmit order by utilizing a time-based queue stored in a time-based storage, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that implement a time-based queue. More specifically, embodiments of the disclosure are directed to time-based queues that utilize time and age for deciding how long objects (for e.g., blocks of data, packets, etc.) will exist in the time-based queues prior to being processed or otherwise transmitted. Regardless of an order added to the time-based queue, the objects may have different Time-to-Live (TTL) values, resulting in some objects being expired before others in same First-In-First-Out (FIFO) queue. Embodiments of the disclosure are generally directed to a time-based queue which can be applied to any use-case that would normally discard objects or messages that exceed a time or age, including by way of non-limiting example real-time interactive media.

In many embodiments, a communication network includes one or more devices or network devices. In some embodiments, for example, the devices may be smartphones, tablets, personal computers, laptops, wearable devices, or other such electronic devices. In certain embodiments, for example, the devices may be access points, bridges, gateways, hubs, modems, repeaters, routers, or switches. The devices may be interconnected with each other either by wired or wireless connections to transmit and/or receive data between the devices. The data may include objects or messages. Sharing the objects between the devices can include one or more steps of: storing, enqueuing/dequeuing, encryption/decryption, error correction, or modulation. A transmitting device may store the objects in a time-based queue in a memory of the transmitting device before processing or transmission. Similarly, a receiving device can store the objects in the memory of the receiving device after reception. In some embodiments, a device can receive an object stream which may be a sequence of various objects. The object stream may comprise multiple objects. The objects may be data packets, messages, or any digital content, for example. The device can determine a maximum TTL value for the object stream. The maximum TTL value may be a maximum duration or lifespan that the object stream can have. The maximum TTL value can be related to a priority of the object stream or the objects therein. The device may create a time-based queue based on the maximum TTL value. The device can assign a TTL value to each object in the object stream. The device may insert the object into the time-based queue at an object insertion time. The TTL value of the object may be indicative of a time duration or a time period beginning from the object insertion time. The TTL value can also be indicative of a lifespan of the object in the time-based queue. In certain embodiments, the device can assign the TTL value to the object based on a requirement of an application that utilizes the object. The TTL value of the object may be predefined by the application. In more embodiments, the device can assign a default TTL value to one or more objects. The default TTL value may differ for different applications that utilize the one or more objects. In some more embodiments, different default TTL values can be utilized for different time-based queues. The device may remove the object from the time-based queue when the time period indicated by the TTL value elapses after the object insertion time. In numerous embodiments, the device can remove the objects from the time-based queue based on FIFO order, TTL values of the objects, priorities of the objects, priority of the time-based queue, or any combination of these factors. At any time, the device can simultaneously maintain multiple time-based queues for multiple applications running on the device. The multiple time-based queues may utilize the objects from the same object stream or different objects from various object streams. The multiple time-based queues may have same priority levels or can have different priorities. Similarly, the various object streams can have same priority level or may have different priorities.

In a number of embodiments, the device may actively or dynamically manage the time-based queue. In that, the device can check the TTL values of the objects in the time-based queue. The device may perform the checks periodically, constantly, or dynamically. In that, the device may identify one or more objects for which the time periods indicated by corresponding TTL values have elapsed. The device can remove the identified objects from the time-based queue. In some embodiments, the device may dynamically modify the TTL value of the object in the time-based queue. In certain embodiments, the device can dynamically modify the maximum TTL value of the time-based queue. In more embodiments, the device may modify the TTL values or the maximum TTL values in real-time or near-real time during transmission or reception of the object stream.

In various embodiments, the device can monitor the time-based queue and the reception of the object stream in real-time or near real-time. The device may detect instances where there is a sudden or significant increase in latency associated with the object stream, for instance, a latency spike in the object stream. The device can determine a recovery time period based on the latency spike. In some embodiments, the recovery time period may relate to a time required by the device to return to normal operating conditions after experiencing the latency spike. In certain embodiments, the device can determine the recovery time period based on one or more of: magnitude, duration, or extent of the latency spike. The device can thereafter monitor the time-based queue to identify the objects having TTL values falling within the recovery time period. In more embodiments, the identified objects may be the objects that are at a risk of expiring or being lost if removed within the recovery time period. The device can thereafter maintain the identified objects in the time-based queue during the recovery time period. When maintaining the multiple time-based queues simultaneously, the device may determine the recovery time period for each time-based queue.

In additional embodiments, the device can determine a queue size for storing the time-based queue. The queue size may be dependent on the maximum TTL value of the time-based queue. The device can thereafter create the time-based queue based on the queue size. In some embodiments, for example, the time-based queues having higher maximum TTL value may have higher queue size whereas the time-based queues having lower maximum TTL values may have lower queue size. Thereafter, the device can store the time-based queue in the memory.

In further embodiments, the device can store the objects in the time-based queue. In some embodiments, the device can store references to the objects in the time-based queue. The references may be links or pointers that can be utilized by the device to retrieve the objects in the time-based queue. In certain embodiments, the references may be memory pointers that point to a time-based storage in the memory of the device. In some more embodiments, the time-based storage can include a bucket array used to store the objects. The objects stored in the bucket array may be indexed based on the TTL values of the objects in the bucket array. In numerous embodiments, for example, the bucket array may be a data structure that utilizes the TTL values as key values that are utilized to create buckets that can store the objects having those TTL values. In many examples, the objects having same TTL values may be stored in same bucket. In some more examples, the objects expiring at same time may be stored in the same bucket.

Advantageously, the device can prevent a buildup of outdated or expired objects in the time-based queue by utilizing a separate TTL value for every object, and dynamically removing the objects with expired TTL values. This may facilitate timely processing or removal of the objects in the time-based queue. Thus, the device can ensure that the objects are processed or transmitted according to their temporal relevance. By doing so, the device can significantly reduce or prevent lag or synchronization issues that are experienced by conventional devices while transmitting real-time or near-real time media or interactive media. In a network experiencing congestion or latency, the device can significantly reduce an impact of the latency spike by ensuring that the objects expiring during the latency spike are not lost or removed during the latency spike. Further, the real-time or near real-time modifications made by the device to the TTL values or the maximum TTL value can ensure that the device rapidly responds to changing transmission or reception conditions in the network without causing loss of data. The device may also modify the TTL values or the maximum TTL value to optimize a memory usage of the device. The device can further modify the TTL values or the maximum TTL value based on the priority of the object stream or the priorities of the objects therein. Moreover, the device may assign the TTL values based on the requirements of the applications that utilize the objects, or may assign the default TTL values to the objects, thereby providing greater flexibility and control over the time-based queue. Thus, utilizing the time-based queue can improve efficiency and adaptability of the device in reacting to dynamically changing network conditions, and can also improve resource utilization within the device.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a device 100, in accordance with various embodiments of the disclosure is shown. The device 100 may include a processor 110 and a dynamic queuing system 120. The dynamic queuing system 120 can include a memory 130. The memory 130 may store a dynamic queuing logic 140, a time-based queue 150, and a time-based storage 160. In some embodiments, for example, the device 100 may be a smartphone, tablet, a personal computer, a laptop, a wearable device, or other such electronic device. In certain embodiments, for example, the device 100 may be an access point, a bridge, a gateway, a hub, a modem, a repeater, a router, or a switch. In more embodiments, the dynamic queuing logic 140 may be implemented by the processor 110.

In many embodiments, the time-based queue 150 may include one or more objects such as objects OBJ 1, OBJ 2, OBJ 3, and OBJ 4 as shown in FIG. 1. In some embodiments, the time-based queue 150 can include references to the objects OBJ 1, OBJ 2, OBJ 3, and OBJ 4. The references may point to memory locations in the time-based storage 160. Each object of the objects OBJ 1, OBJ 2, OBJ 3, and OBJ 4 may have a Time-To-Live (TTL) value. The objects OBJ 1, OBJ 2, OBJ 3, and OBJ 4 may be stored in the memory based on the corresponding TTL values. The objects OBJ 1, OBJ 2, OBJ 3, and OBJ 4 may be stored in a bucket array that is indexed based on the TTL values corresponding to the objects OBJ 1, OBJ 2, OBJ 3, and OBJ 4. In some embodiments, for example, as shown in FIG. 1, the object OBJ1 having a TTL value T1 is stored in a bucket indexed by T1. The device 100 may group the objects having same TTL values into the same bucket. The objects OBJ 1, OBJ 2, OBJ 3, and OBJ 4 may be generated within the device 100 or may be received by the device 100 for forwarding, processing, or transmission.

In many embodiments, the dynamic queuing logic 140 can generate, maintain, monitor, or modify the time-based queue 150. In some embodiments, the dynamic queuing logic 140 receives an object stream including the objects OBJ 1, OBJ 2, OBJ 3, and OBJ 4. The dynamic queuing logic 140 can receive the objects OBJ 1, OBJ 2, OBJ 3, and OBJ 4 from the processor 110 or from an external device connected to the device 100. The dynamic queuing logic 140 can determine a maximum TTL value for the object stream. The dynamic queuing logic 140 may further generate the time-based queue 150 based on the maximum TTL value. The dynamic queuing logic 140 can store the time-based queue 150 in the memory. The dynamic queuing logic 140 can further allocate one or more memory locations of the time-based storage 160 for storing the objects OBJ 1, OBJ 2, OBJ 3, and OBJ 4. The dynamic queuing logic 140 may assign a TTL value for each object of the objects OBJ 1, OBJ 2, OBJ 3, and OBJ 4.

Although a specific embodiment for the device 100 for carrying out the various steps, processes, methods, and operations described herein is discussed with respect to FIG. 1, any of a variety of systems and/or processes may be utilized in accordance with embodiments of the disclosure. For example, the device 100 may be a transmitter or a receiver in wired or wireless communication networks. The elements depicted in FIG. 1 may also be interchangeable with other elements of FIGS. 2-12 as required to realize a particularly desired embodiment.

Referring to FIG. 2, a conceptual illustration of a time-based queue 200, in accordance with various embodiments of the disclosure is shown. In some embodiments, the time-based queue 200 may be configured to drop or remove messages on a pop operation, for example. Traditional queues suffer from buffer bloat as old messages that should have been removed remain in queue until they are requested or popped from the queues. An attempt to purge this queue often suffers from O(n) complexity due to the queues needing to be iterated to determine which objects have expired and should be removed. As shown in FIG. 2, a current age at time of OBJ 1 dequeue or pop is 3. In some embodiments, for example, the objects such as the object OBJ 3 may be too old, even if the object OBJ 3 was being dequeued next and should be removed.

In many embodiments, the objects may expire based on the time they are inserted into the time-based queue 200. For example, an age of the object may start once the object is added to the time-based queue 200. To that end, a per-object TTL can be realized. The TTL value of the object in the time-based queue 200 may refer to a time period for which the object, for example, is allowed to remain in the time-based queue 200 before the object expires or is automatically removed. The TTL value may represent the maximum lifespan of the object within the time-based queue 200, after which the object is considered outdated or irrelevant. The TTL value may be specified or assigned when the object is enqueued or inserted in the time-based queue 200, and the time-based queue 200 may start counting down from the time of object insertion. Once the time period indicated by the TTL value expires, the object can be either automatically removed from the time-based queue 200 or can be marked as expired, depending on implementation of the time-based queue 200. The TTL value may be used in message queues or event-driven systems to ensure that messages or objects are processed within a certain timeframe and to prevent them from remaining in the queue indefinitely. By setting an appropriate TTL value, resources of the device can be managed efficiently, and obsolete data can be avoided. In some embodiments, for example, the appropriate TTL value can be assigned based on a requirement of an application that utilizes the object. The TTL value of the object may be predefined by the application. In certain embodiments, for example, the device can assign a default TTL value to one or more objects. The default TTL value may differ for different applications that utilize the one or more objects. In more embodiments, for example, different default TTL values can be utilized for different time-based queues.

In a number of embodiments, the buffer bloat can be mitigated by purging or removing the expired objects with a complexity close to O(1), such that the FIFO order is maintained. In some embodiments, scale may approach 100,000,000+ per second. In other words, in certain embodiments, the time-based queue 200 can handle an extremely high number of items or tasks being processed per second. Thus, the time-based queue 200 may be optimized and configured to handle an enormous load of items or objects at an exceptional rate. Such a high throughput can be beneficial in scenarios where there is a significant amount of incoming data or tasks that need to be processed quickly and efficiently, such as high-frequency trading, real-time data processing, or large-scale event-driven systems.

In various embodiments, the objects that are removed, i.e., dequeued or popped can be guaranteed to not have an age greater than corresponding TTL value. It is envisioned that the time-based queue 200 may perform well enough to be utilized or otherwise configured for transmitter and receiver network or socket buffers. In some embodiments, a similar memory footprint may be utilized as with circular queues or buffers. Furthermore, a maximum buffer time may be guaranteed from insert (or push) to remove (or pop). It is envisioned that buffer data (aka., block, object, message, item) with a TTL value in the time-based queue 200 can perform similar to standard or traditional FIFO queues albeit with significant performance advantages as described herein.

In additional embodiments, it should be appreciated that it is not ideal to store and deliver objects from a queue out of the order they were received or inserted. Most queues are FIFO for this reason. To that end, the objects added to a queue first are generally delivered first. If the object is to be removed, the operation to remove the object often is often costly. In some embodiments, for example, during an iterate step, the objects that have expired are found. During a stitching step, memory moves and/or pointer updates to remove the object that has expired. With multi-threading, locking may be required during iteration and stitching. In the context of a queue, purging operations may be carried out during push (i.e., insertion) and/or pop (i.e., removal) operations. This can impact the performance dramatically when having to iterate and stitch with locking.

In further embodiments, many network quality issues can be caused due to transmission from a client over a congested or noisy link (e.g., WIFI, LTE, etc.). Congestion control algorithms, such as BBR, new-reno, cubic, etc. can slow the transmission to adapt to latency and/or loss. Interactive use-cases are timed/latency-based, not finite/circular capacity based. In the case of media, such as audio/video, it may be okay to buffer/queue so long as a maximum time in queue is not exceeded. Exceeding the time in the queue can result in the receiver dropping the packets/data. With traditional queues (even circular), traditional queuing causes buffer/queue bloat where queues are filled with data that will be discarded by the receiver when transmitted. This is realized often when using reliable transports that do not give up on sending data. The challenge with traditional queuing is that it causes buffer bloat as well as time complexity to purge out aging data objects in the queue. Embodiments of the disclosure address time complexity and buffer bloat by leveraging an innovative implementation that consists of time-based memory storage and a time-based FIFO queue to maintain order.

Although a specific embodiment for the time-based queue 200 for carrying out the various steps, processes, methods, and operations described herein is discussed with respect to FIG. 2, any of a variety of systems and/or processes may be utilized in accordance with embodiments of the disclosure. For example, the time-based queue 200 may be modified dynamically by the device. The elements depicted in FIG. 2 may also be interchangeable with other elements of FIG. 1 and FIGS. 3-12 as required to realize a particularly desired embodiment.

Referring to FIG. 3, a conceptual illustration of maintaining receive to transmit order by utilizing a time-based queue stored in a time-based storage 300, in accordance with various embodiments of the disclosure is shown. The time-based queue may be a time-based FIFO queue stored in the time-based storage 300. In some embodiments, objects are stored into the time-based storage 300 of the device. The time-based storage 300 may be sliced into interval segments based on a total duration time divided by a maximum number of buckets (such as memory storage buckets). A sum of all the buckets should equal the maximum TTL value of the time-based FIFO queue. The time-based storage 300 can utilize a predetermined or fixed number of buckets. A marker, as shown in FIG. 3, pointing to a current time interval may indicate which bucket is a current index point in the array of buckets.

In many embodiments, each index in the array can be an increment of time. The index behind current index can be the most future index. The objects may be stored based on their TTL value plus the current position or index. In some embodiments, for examples, if the interval is 2 ms and the TTL value is 4, then the bucket is +1; and if the TTL value is 8 and the interval is 2 ms, then the index is +3. In other words, the objects may be stored into the bucket array ahead of the current index based on the TTL value of the object. Storing the objects into time-based storage 300 based on the bucket array can enable an ability to quickly remove entire sets of the objects. Utilizing the time-based FIFO queue to reference the stored objects provides order. In certain embodiments, the objects may not be stored twice.

In a number of embodiments, there can be a challenge with the time-based FIFO queue and maintaining order with mixed TTL values. The objects in the time-based FIFO queue may have different TTL values and might expire while waiting to be popped. In some embodiments, the time-based FIFO queue can include references to the memory locations in the time-based storage 300 where the objects that are stored. In certain embodiments, for example, such as bucket 4, index 101. While the time-based FIFO queue contains a reference to each object, it no longer causes buffer bloat because the time-based FIFO queue includes the references to the memory locations in the time-based storage 300.

Removing or popping objects from the time-based FIFO queue can efficiently skip the objects that have been expired. In more embodiments, the expired objects may be detected by comparing stored bucket index to current index minus 1, checking if the bucket index has data, and/or comparing last cleared bucket to current index.

Although a specific embodiment for the time-based FIFO queue stored in the time-based storage 300 for carrying out the various steps, processes, methods, and operations described herein is discussed with respect to FIG. 3, any of a variety of systems and/or processes may be utilized in accordance with embodiments of the disclosure. For example, the time-based storage 300 may facilitate dynamic insertion or removal of the objects based on the TTL values. The elements depicted in FIG. 3 may also be interchangeable with other elements of FIGS. 1-2 and FIGS. 4-12 as required to realize a particularly desired embodiment.

Figure 4:
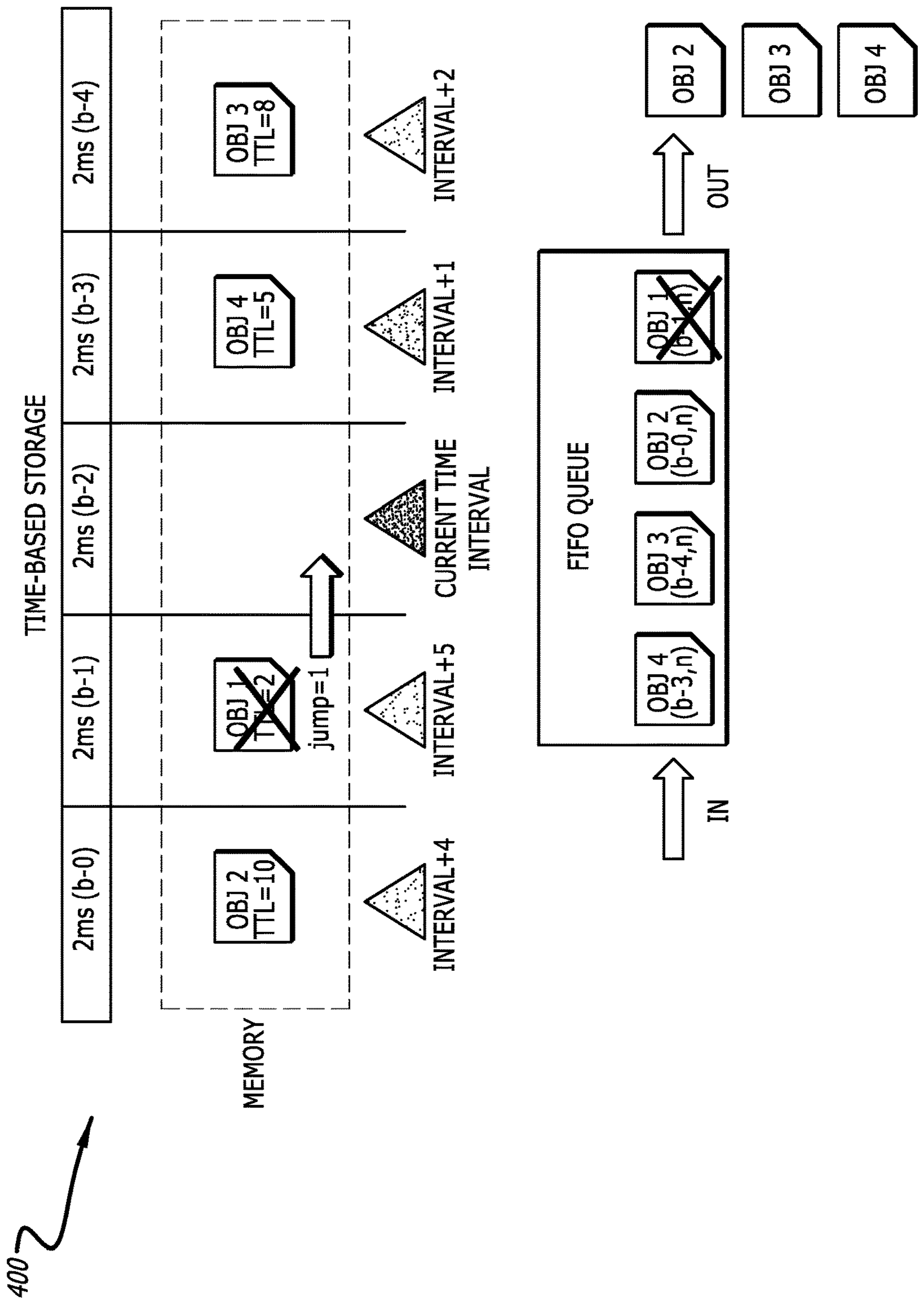
FIG. 4 is a conceptual illustration of skipping objects in a time-based queue, in accordance with various embodiments of the disclosure.

Referring to FIG. 4, a conceptual illustration of skipping objects in a time-based queue 400, in accordance with various embodiments of the disclosure is shown. In some embodiments, moving forward in time, previous time and current time may be calculated to determine the number of intervals (or jumps) that the current index should advance. Each jumped interval can be considered old and can be cleared. When advancing one interval at a time, the last (previous) interval can be cleared. In certain embodiments, the expired objects may be skipped while popping the objects out of the time-based queue 400. In more embodiments, for example, as shown in FIG. 4, an object OBJ 1 that has been removed from the time-based queue 400 may be skipped while popping the objects from the time-based queue 400.

Although a specific embodiment for skipping objects in the time-based queue 400 for carrying out the various steps, processes, methods, and operations described herein is discussed with respect to FIG. 4, any of a variety of systems and/or processes may be utilized in accordance with embodiments of the disclosure. For example, the time-based queue 400 may facilitate skipping the objects that are expired or removed. The elements depicted in FIG. 4 may also be interchangeable with other elements of FIGS. 1-3 and FIGS. 5-12 as required to realize a particularly desired embodiment.

Figure 5:
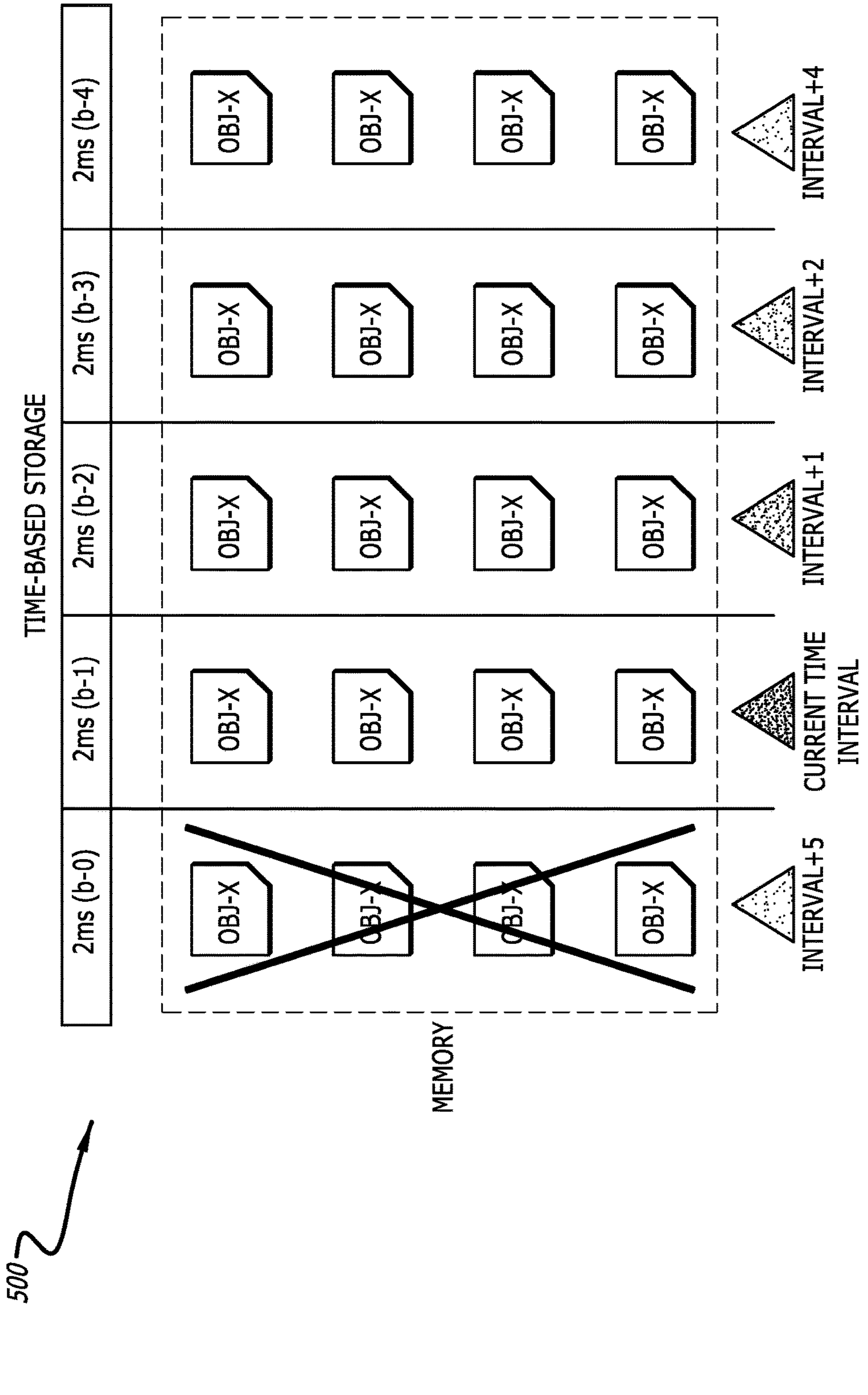
FIG. 5 is a conceptual illustration of a time-based queue configured as a multidimensional array, in accordance with various embodiments of the disclosure.

Referring to FIG. 5, a conceptual illustration of a time-based queue 500 configured as a multidimensional array, in accordance with various embodiments of the disclosure is shown. In some embodiments, an array of arrays is implemented, wherein each object is stored in a bucket array indexed by an interval. Those skilled in the art will appreciate that the time-based queue 500 may be configured as a multidimensional array that represents a data structure that allows elements to be organized in a grid-like configuration. The data structure can comprise multiple arrays, where each array can store a collection of values. A primary array can serve as a container, while one or more nested arrays can hold individual elements. This configuration may enable a representation of complex data structures, such as matrices or tables. Alternatively, instead of using an array within an array, other data structures like lists of lists or dictionaries of lists can be utilized to achieve similar functionalities, offering flexibility and ease of manipulation depending on a programming language or context.

In many embodiments, removing objects can be as simple as clearing the bucket. The time-based queue 500 of references can adapt to the removal. In the time-based queue 500, each message may have a location (bucket and bucket array index) and current bucket index of when the object was inserted. The time-based queue 500 may adapt to clear by using the below process: if "location bucket index" is greater or equal to bucket size or if current time is greater than expiry time, then the object is too old, skip; Expiry time is insertion time plus TTL.

In a number of embodiments, an act or operation of moving forward in time and expiring objects may be triggered upon push and pop/front operations to ensure the efficient management and timely processing of the objects. When a new item is pushed into the time-based queue 500, the device may advance forward in time, evaluating the expiration status of existing objects. This may help identify and remove any objects that have exceeded their designated lifespan or have become obsolete. Similarly, during pop or front operations, the time-based queue 500 may advance in time, allowing any expired elements at the front of the time-based queue 500 to be removed, making space for new incoming items. By incorporating time-based expiration mechanisms within push and pop or front operations, the time-based queue 500 maintains a streamlined and up-to-date collection of the objects, facilitating smoother and more relevant data processing. A timer thread may be utilized, but it is not required. This may enable faster storage and queue management performance with less locking for multi-threaded implementations.

Although a specific embodiment for the time-based queue 500 configured as the multidimensional array for carrying out the various steps, processes, methods, and operations described herein is discussed with respect to FIG. 5, any of a variety of systems and/or processes may be utilized in accordance with embodiments of the disclosure. For example, the time-based queue 500 may utilize efficient data structures including, but not limited to, multidimensional arrays to store and manage the objects efficiently and quickly. The elements depicted in FIG. 5 may also be interchangeable with other elements of FIGS. 1-4 and FIGS. 6-12 as required to realize a particularly desired embodiment.

Figure 6:
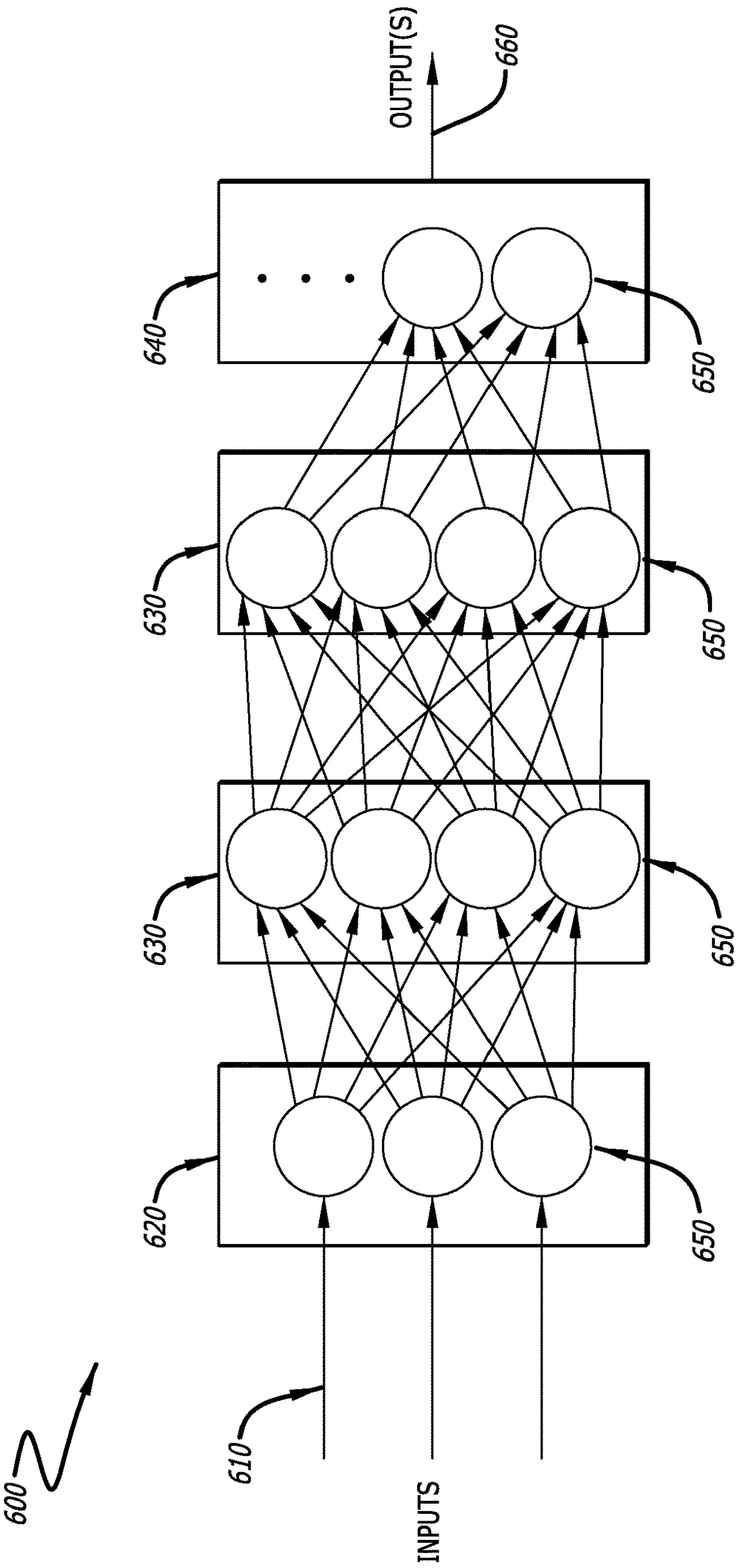
FIG. 6 is a conceptual illustration of an artificial neural network in accordance with various embodiments of the disclosure.

Referring to FIG. 6, a conceptual illustration of an artificial neural network 600, in accordance with various embodiments of the disclosure is shown. As those skilled in the art will recognize, various methods of machine learning models can be utilized to achieve desired outcomes efficiently. For example, some embodiments may utilize decisions trees, random forests, support vector machines, naïve Bayes, or K-nearest neighbors algorithms. However, artificial neural networks have increased in popularity, especially in deep learning techniques where detection of complex patterns in data and the ability to solve a wide range of problems has been desired. In various embodiments, an artificial neural network may be utilized. Artificial neural networks are a type of machine learning model inspired by the structure and function of the human brain, and often consist of three main types of layers: the input layer, the output layer, and one or more intermediate (also called hidden) layers.

In many embodiments, the input layer is responsible for receiving input data, which could be anything from an image to a text document to numerical values. Each input feature can be represented by a node in the input layer. Conversely, the output layer is often responsible for producing the output of the network, which could be, for example, a prediction or a classification. The number of nodes in the output layer can depend on the task at hand. For example, if the task is to classify images into ten different categories, there would be ten nodes in the output layer, each representing a different category.

In a number of embodiments, the intermediate layers are where the specialized connections are made. These intermediate layers are responsible for transforming the input data in a non-linear way to extract meaningful features that can be used for the final output. In various embodiments, a node in an intermediate layer can take as an input a weighted sum of the outputs from the previous layer, apply a non-linear activation function to it, and pass the result on to the next layer. The weights of the connections between nodes in the layers are learned during training. This training can utilize backpropagation, which may involve calculating the gradient of the error with respect to the weights and adjusting the weights accordingly to minimize the error.

In various embodiments, at a high level, the artificial neural network 600 depicted in the embodiment of FIG. 6 includes a number of inputs 610, an input layer 620, one or more intermediate layers 630, and an output layer 640. The artificial neural network 600 may comprise a collection of connected units or nodes called artificial neurons 650, which loosely model the neurons in a biological brain. Each connection, like the synapses in a biological brain, can transmit a signal from one artificial neuron to another. An artificial neuron that receives a signal can process the signal and then trigger additional artificial neurons within the next layer of the neural network. As those skilled in the art will recognize, the artificial neural network 600 depicted in FIG. 6 is shown as an illustrative example, and various embodiments may comprise artificial neural networks that can accept more than one type of input and can provide more than one type of output.

In additional embodiments, the signal at a connection between artificial neurons is a value, and the output of each artificial neuron is computed by some nonlinear function (called an activation function) of the sum of the artificial neuron's inputs. Often, the connections between artificial neurons are called "edges" or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals propagate from the first layer (the input layer 620) to the last layer (the output layer 640), possibly after traversing one or more intermediate layers (also called hidden layers) 630.

In further embodiments, the inputs to an artificial neural network may vary depending on the problem being addressed. In object detection for example, the inputs may be data representing values for certain corresponding actual measurements or values within the object to be detected. In one embodiment, the artificial neural network 600 comprises a series of hidden layers in which each neuron is fully connected to neurons of the next layer. The artificial neural network 600 may utilize an activation function such as sigmoid, nonlinear, or a rectified linear unit (ReLU), upon the sum of the weighted inputs, for example. The last layer in the artificial neural network may implement a regression function to produce the classified or predicted classifications output for object detection as output 660. In further embodiments, a sigmoid function can be used, and the prediction may need raw output transformation into linear and/or nonlinear data.

In many more embodiments, although a specific embodiment for an artificial neural network machine learning model suitable for carrying out the various steps, processes, methods, and operations described herein is discussed with respect to FIG. 6, any of a variety of systems and/or processes may be utilized in accordance with embodiments of the disclosure. For example, the artificial neural network may be external operated, such as through a cloud-based service, or a third-party service. The elements depicted in FIG. 6 may also be interchangeable with other elements of FIGS. 1-5 and 7-12 as required to realize a particularly desired embodiment.

Although a specific embodiment for the artificial neural network 600 for carrying out the various steps, processes, methods, and operations described herein is discussed with respect to FIG. 6, any of a variety of systems and/or processes may be utilized in accordance with embodiments of the disclosure. For example, the artificial neural network 600 may be externally operated, such as through a cloud-based service, or a third-party service. The elements depicted in FIG. 6 may also be interchangeable with other elements of FIGS. 1-5 and FIGS. 7-12 as required to realize a particularly desired embodiment.

Figure 7:
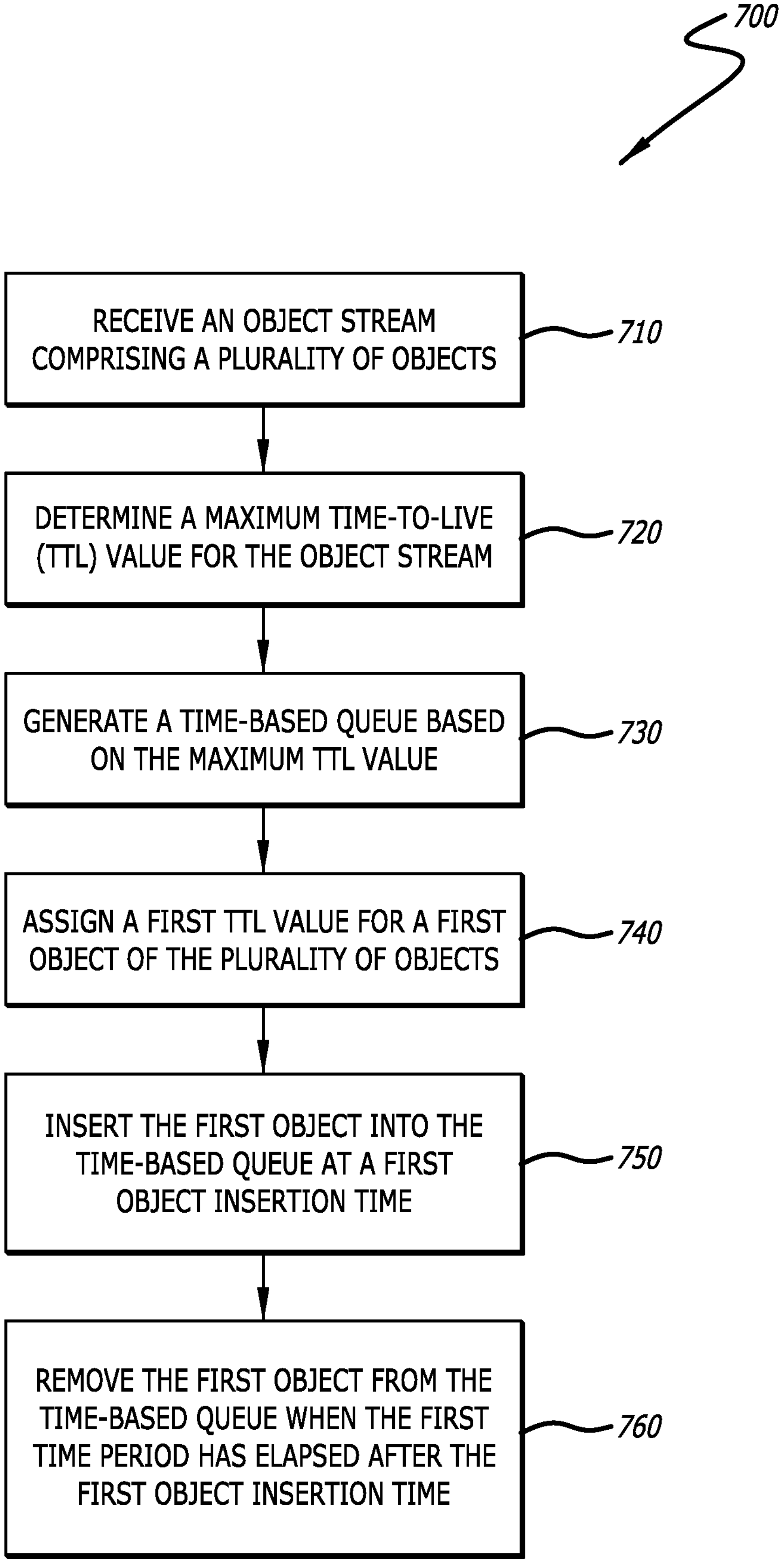
FIG. 7 is a flowchart depicting a process for generating and utilizing a time-based queue, in accordance with various embodiments of the disclosure.

Referring to FIG. 7, a flowchart depicting a process 700 for generating and utilizing a time-based queue, in accordance with various embodiments of the disclosure is shown. In many embodiments, the process 700 can receive an object stream (block 710). In some embodiments, the process 700 may be implemented by a device in a digital network, for examples, the device may be a smartphone, tablet, a personal computer, a laptop, a wearable device, or other such electronic device, for more examples, the device may be an access point, a bridge, a gateway, a hub, a modem, a repeater, a router, or a switch. In certain embodiments, the device can execute a dynamic queuing logic. In more embodiments, the object stream may comprise a plurality of objects. In more embodiments, the objects may be data packets, messages, or any digital content, for example.

In a number of embodiments, the process 700 can determine a maximum Time-To-Live (TTL) value for the object stream (block 720). In some embodiments, the maximum TTL value may be a maximum duration or lifespan that the objects in the object stream can have before the objects become obsolete. In certain embodiments, the maximum TTL value can be related to a priority of the object stream or the objects therein.

In various embodiments, the process 700 may generate a time-based queue based on the maximum TTL value (block 730). In some embodiments, the process 700 can store the time-based queue in a time-based storage in the device. In certain embodiments, the maximum TTL value may indicate a time period or a lifespan of the time-based queue after which the time-based queue can be outdated or expire. In more embodiments, the process 700 can determine a queue size based on the maximum TTL value. In some more embodiments, the process 700 can further create and store the time-based queue based on the queue size. In numerous embodiments, the process 700 can allocate one or more memory locations in the time-based storage in the device to store the objects in the time-based queue. In many further embodiments, for example, the time-based queues having higher maximum TTL value may have higher queue size whereas the time-based queues having lower maximum TTL values may have lower queue size.

In additional embodiments, the process 700 can assign a first TTL value for a first object of the plurality of objects (block 740). In some embodiments, the first TTL value may be indicative of a first time duration or a first time period beginning from a first object insertion time. In certain embodiments, the first object insertion time may be indicative of a time or instant when the first object is added to the time-based queue. In more embodiments, the first TTL value can be indicative of a lifespan of the first object in the time-based queue. In some more embodiments, the process 700 may assign a TTL value to each object in the object stream. In numerous embodiments, no TTL value assigned to any object can be greater than the maximum TTL value assigned to the object stream. In many further embodiments, for example, the process 700 can assign the first TTL value based on the requirement of the application that utilizes the first object. In various embodiments, the first TTL value may be predefined by the application. In still more embodiments, for example, the process 700 can assign the default TTL value as the first TTL value for the first object. In many additional embodiments, the default TTL value may differ for different applications that utilize the first object. In still further embodiments, for example, the process 700 can utilize different default TTL values for different time-based queues.

In further embodiments, the process 700 may insert the first object into the time-based queue at the first object insertion time (block 750). In some embodiments, an age of the first object may start at the first object insertion time. In certain embodiments, the first TTL value may represent the maximum lifespan of the first object within the time-based queue. In more embodiments, the first TTL value is less than the maximum TTL value.

In many more embodiments, the process 700 can remove the first object from the time-based queue when the first time period has elapsed after the first object insertion time (block 760). In some embodiments, the first object can be either automatically removed from the time-based queue or can be marked as expired, depending on implementation of the time-based queue. In certain embodiments, the objects that are removed from the time-based queue can be guaranteed to not have an age greater than corresponding TTL value. In more embodiments, the process 700 can remove the objects in the time-based queue based on FIFO order. In some more embodiments, process 700 may remove the objects in the time-based queue based on the FIFO order, the TTL values of the objects, priorities of the objects, priority of the time-based queue, or any combination of these factors.

Although a specific embodiment for the process 700 to generate and utilize a time-based queue is described above with respect to FIG. 7, any of a variety of systems and/or processes may be utilized in accordance with embodiments of the disclosure. For example, the process 700 may facilitate object insertion and object removal in the time-based queue based on per-object TTL values. The aspects described in FIG. 7 may also be interchangeable with other elements of FIGS. 1-6 and FIGS. 8-12 as required to realize a particularly desired embodiment.

Figure 8:
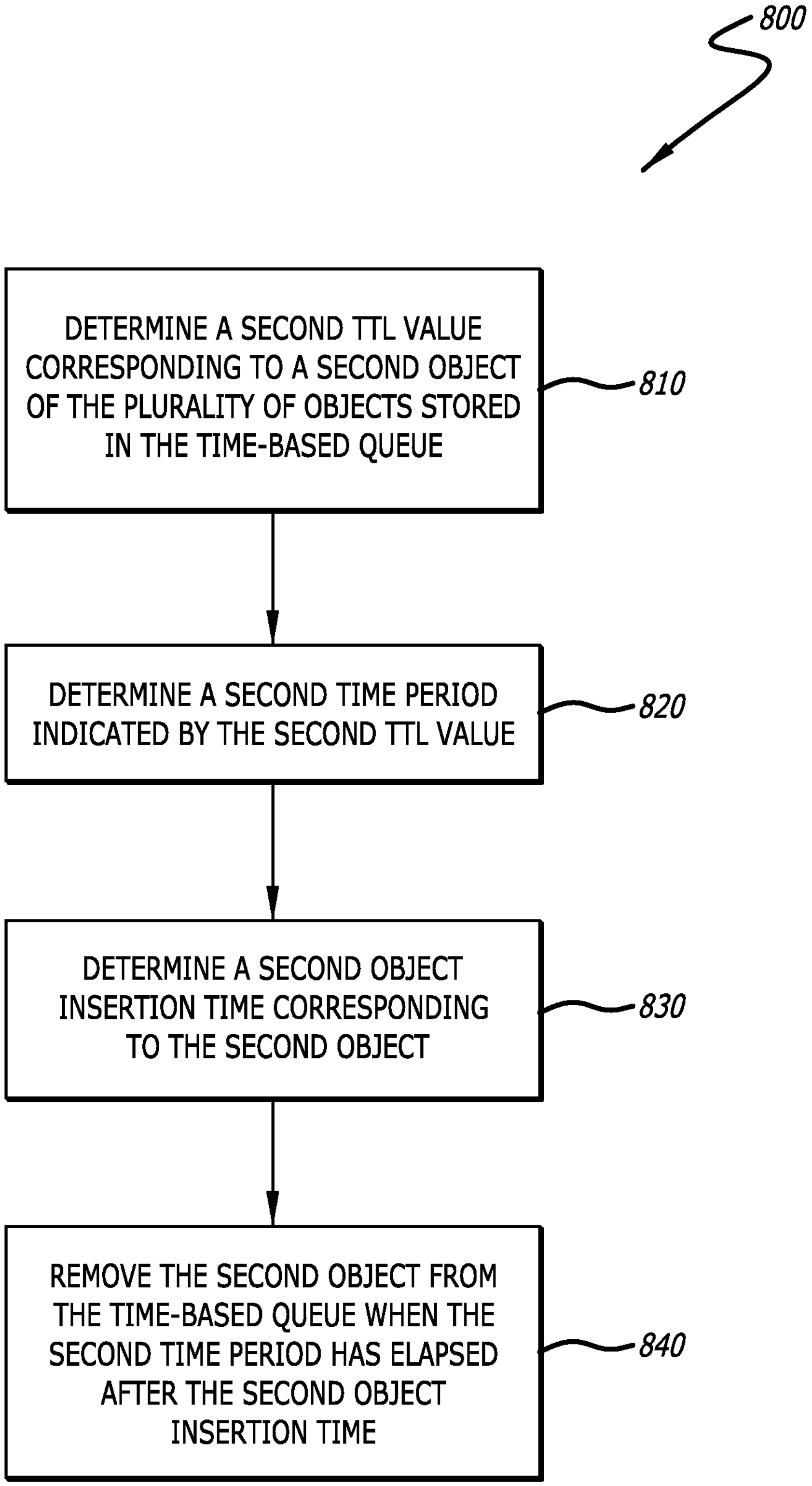
FIG. 8 is a flowchart depicting a process for removing an object from a time-based queue, in accordance with various embodiments of the disclosure.

Referring to FIG. 8, a flowchart depicting a process 800 for removing an object from a time-based queue, in accordance with various embodiments of the disclosure is shown. In many embodiments, the process 800 can determine a second TTL value corresponding to a second object of the plurality of objects stored in the time-based queue (block 810). In some embodiments, the process 800 may actively or dynamically manage the time-based queue. In certain embodiments, the process 800 can check the TTL values of the objects in the time-based queue. In more embodiments, the process 800 may perform the checks periodically, constantly, or dynamically.

In a number of embodiments, the process 800 may determine a second time period indicated by the second TTL value (block 820). In some embodiments, the second TTL value may be indicative of the second time period beginning from a second object insertion time. In certain embodiments, the second TTL value can be indicative of a lifespan of the second object in the time-based queue.

In various embodiments, the process 800 can determine the second object insertion time corresponding to the second object (block 830). In some embodiments, the second object insertion time may be indicative of a time or instant when the second object is added to the time-based queue. In certain embodiments, an age of the second object may start at the second object insertion time.

In additional embodiments, the process 800 may remove the second object from the time-based queue when the second time period has elapsed after the second object insertion time (block 840). In some embodiments, the process 800 may dequeue or purge the second object from the time-based queue. In certain embodiments, the process 800 may dynamically identify one or more objects for which the time periods indicated by corresponding TTL values have elapsed, and the process 800 can thereafter remove the identified objects from the time-based queue. In more embodiments, the process 800 may prevent buffer bloating and buildup of obsolete data in the time-based queue by removing the expired objects from the time-based.

Although a specific embodiment for the process 800 to remove the object from the time-based queue is described above with respect to FIG. 8, any of a variety of systems and/or processes may be utilized in accordance with embodiments of the disclosure. For example, the process 800 may dynamically monitor or alter the time-based queue in real-time or near real-time to maintain temporal relevancy of the time-based queue and the objects in the time-based queue. The aspects described in FIG. 8 may also be interchangeable with other elements of FIGS. 1-7 and FIGS. 9-12 as required to realize a particularly desired embodiment.

Figure 9:
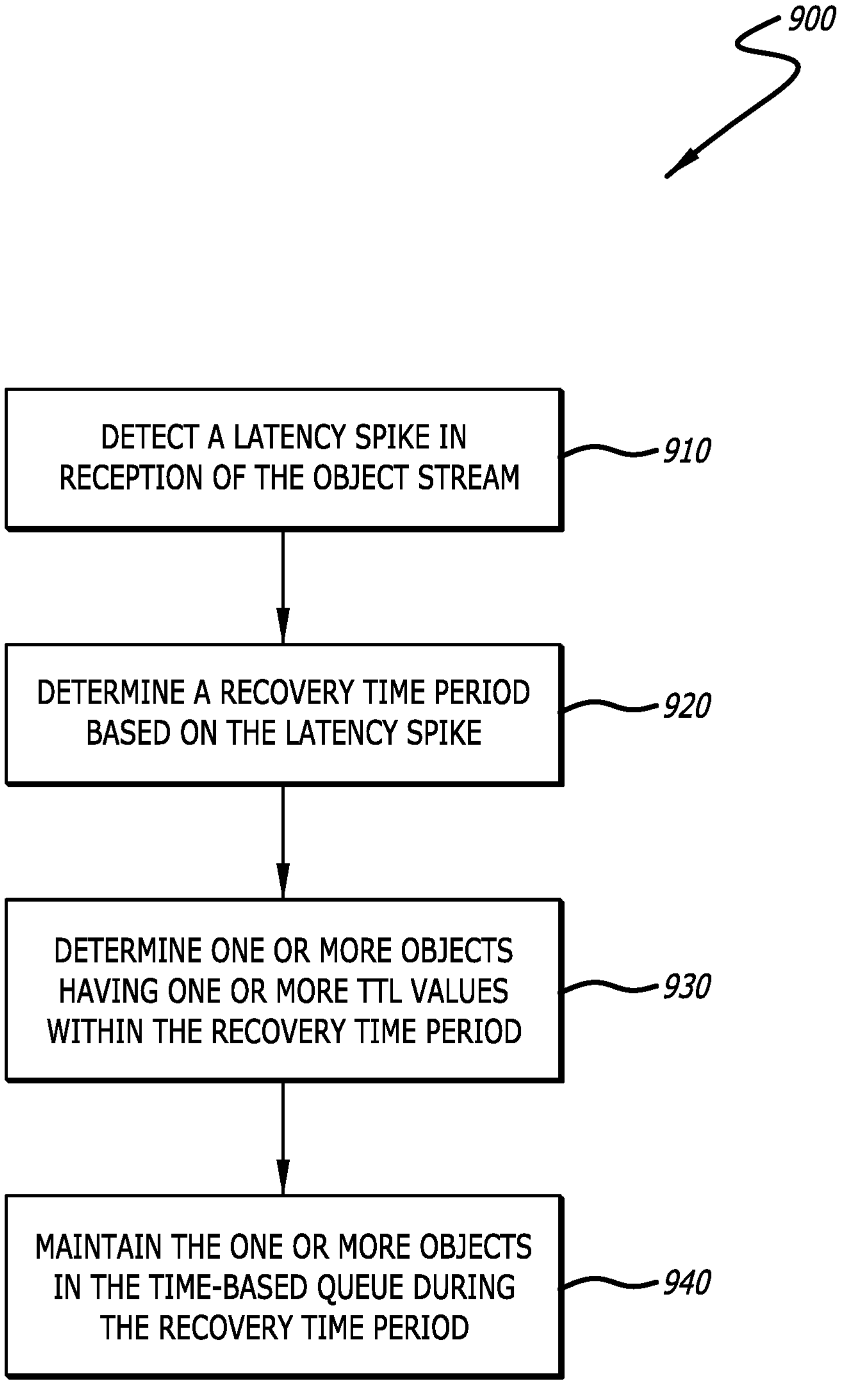
FIG. 9 is a flowchart depicting a process for modifying a time-based queue based on detection of a latency spike, in accordance with various embodiments of the disclosure.

Referring to FIG. 9, a flowchart depicting a process 900 for modifying the time-based queue based on detection of a latency spike, in accordance with various embodiments of the disclosure is shown. In many embodiments, the process 900 can detect a latency spike in reception of the object stream (block 910). In some embodiments, the process 900 can monitor the time-based queue and the reception of the object stream in real-time or near real-time. In certain embodiments, the process 900 may detect instances where there is a sudden or significant increase in latency associated with the object stream, for instance, the latency spike in the object stream.

In a number of embodiments, the process 900 may determine a recovery time period based on the latency spike (block 920). In some embodiments, the recovery time period may relate to a time required by the process 900 to return to normal operating conditions after experiencing the latency spike. In certain embodiments, the process 900 can determine the recovery time period based on one or more of: magnitude, duration, or extent of the latency spike.

In various embodiments, the process 900 can determine one or more objects having one or more TTL values within the recovery time period (block 930). In some embodiments, the process 900 can monitor the time-based queue to identify the objects having TTL values falling within the recovery time period. In certain embodiments, the identified objects may be the objects that are at a risk of expiring or being lost if removed within the recovery time period.

In additional embodiments, the process 900 may maintain the one or more objects in the time-based queue during the recovery time period (block 940). In some embodiments, the process 900 can prevent loss of the objects that are at risk of expiring within the recovery time period by not removing the identified objects until after the recovery time period. In certain embodiments, process 900 may transmit or process the identified objects even if the identified objects have reached end of their lifespan indicated by the corresponding TTL values.

Although a specific embodiment for the process 900 to modify the time-based queue based on detection of the latency spike is described above with respect to FIG. 9, any of a variety of systems and/or processes may be utilized in accordance with embodiments of the disclosure. For example, the process 900 may dynamically alter the implementation of the time-based queue to counter the effects of the latency spike in the object stream. The aspects described in FIG. 9 may also be interchangeable with other elements of FIGS. 1-8 and FIGS. 10-12 as required to realize a particularly desired embodiment.

Figure 10:
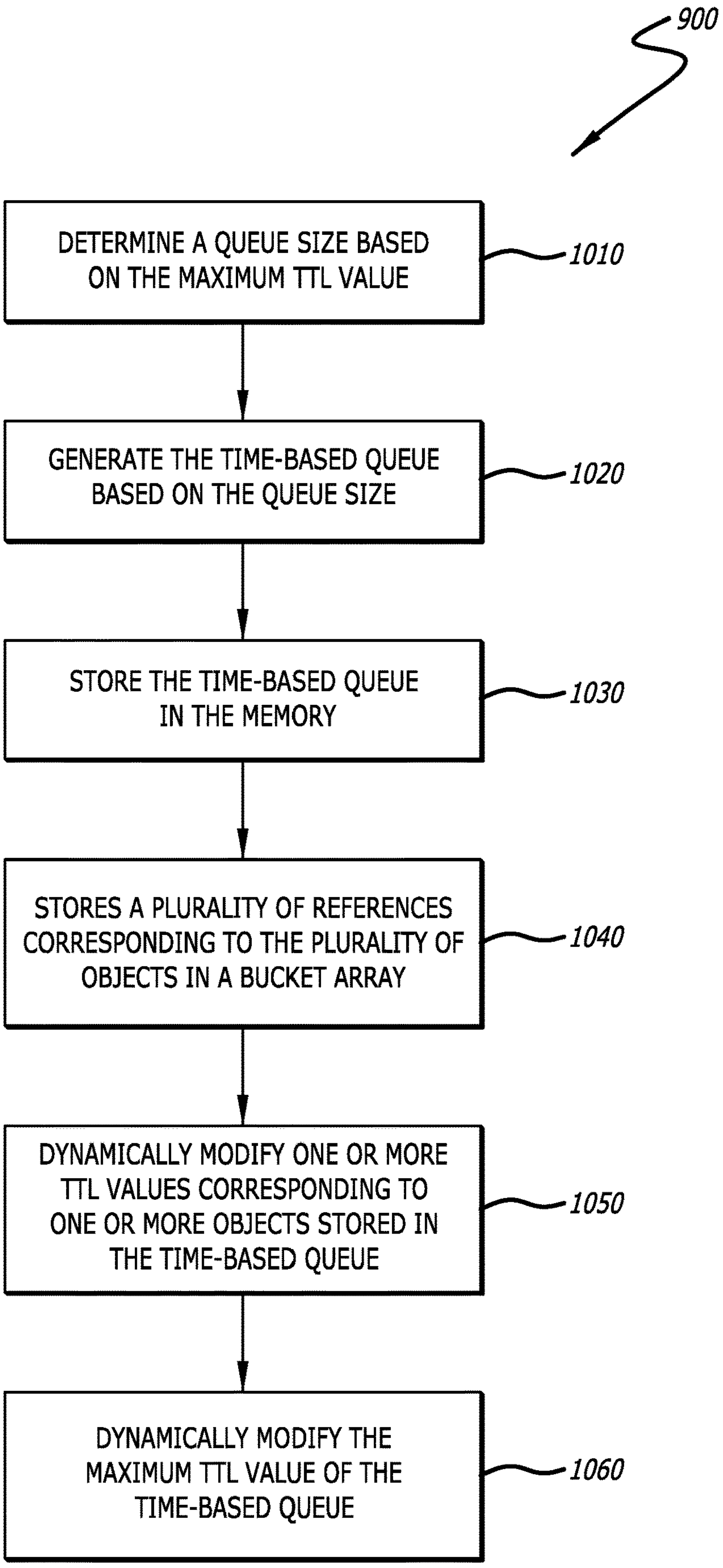
FIG. 10 is a flowchart depicting a process for dynamically adjusting Time-To-Live (TTL) values, in accordance with various embodiments of the disclosure.

Referring to FIG. 10, a flowchart depicting a process 1000 for dynamically adjusting the TTL values, in accordance with various embodiments of the disclosure is shown. In many embodiments, the process 1000 can determine the queue size based on the maximum TTL value (block 1010). In some embodiments, for example, the time-based queues having higher maximum TTL value may have higher queue size whereas the time-based queues having lower maximum TTL values may have lower queue size.

In a number of embodiments, the process 1000 may generate the time-based queue based on the queue size of the time-based queue (block 1020). In some embodiments, after generating the time-based queue, the process 1000 may store the time-based queue in the time-based storage in the memory. In certain embodiments, the process 1000 can store references to the objects in the time-based queue. In more embodiments, the references may be links or pointers that can be utilized by the process 1000 to retrieve the objects in the time-based queue. In some more embodiments, the references may be memory pointers that point to the time-based storage in the memory of the device.

In various embodiments, the process 1000 can store the time-based queue in the memory (block 1030). In some embodiments, the process 1000 can allot a region of memory or one or more memory locations in the time-based storage in the device based on the determined queue size. In certain embodiments, the process 1000 can store the objects in the time-based queue.

In additional embodiments, the process 1000 may store the references corresponding to the objects in a bucket array (block 1040). In some embodiments, the time-based storage can include the bucket array used to store the objects. In certain embodiments, the objects stored in the bucket array may be indexed based on the TTL values of the objects in the bucket array. In more additional embodiments, for example, the bucket array may be a data structure that utilizes the TTL values as key values that are utilized to create buckets that can store the objects having those TTL values. In some more examples, the objects having same TTL values may be stored in same bucket. In numerous embodiments, the objects expiring at the same time may be stored in the same bucket.

In further embodiments, the process 1000 can dynamically modify one or more TTL values corresponding to one or more objects stored in the time-based queue (block 1050). In some embodiments, the process 1000 may modify the TTL values or the maximum TTL value in real-time or near real-time to ensure that the process 1000 rapidly responds to changing transmission or reception conditions without causing loss of the data. In certain embodiments, the process 1000 may also modify the TTL values or the maximum TTL value to optimize a memory usage of the device. In more embodiments, the process 1000 can further modify the TTL values or the maximum TTL value based on a priority of the object stream or the priorities of the objects therein. In some more embodiments, process 1000 can facilitate efficiency and adaptability of the process 1000 in reacting to dynamically changing conditions by altering the time-based queue dynamically.

In many more embodiments, the process 1000 may dynamically modify the maximum TTL value of the time-based queue (block 1060). In some embodiments, the process 1000 can prevent the buildup of outdated or expired objects in the time-based queue by utilizing separate TTL value for every object along with the maximum TTL value. In certain embodiments, the modification of the maximum TTL value may facilitate timely processing of the objects in the time-based queue. In more embodiments, the process 1000 can ensure that the objects are processed or transmitted according to their temporal relevance.

Although a specific embodiment for the process 1000 to dynamically adjust the TTL values is described above with respect to FIG. 10, any of a variety of systems and/or processes may be utilized in accordance with embodiments of the disclosure. For example, the process 1000 may facilitate effective memory utilization and enhanced efficiency of processing or transmission of the objects by dynamically changing the TTL values of the objects and the maximum TTL value of the time-based queue to counter the effects of changes in the operating conditions, transmission conditions, or processing conditions. The aspects described in FIG. 10 may also be interchangeable with other elements of FIGS. 1-9 and FIGS. 11-12 as required to realize a particularly desired embodiment.

Figure 11:
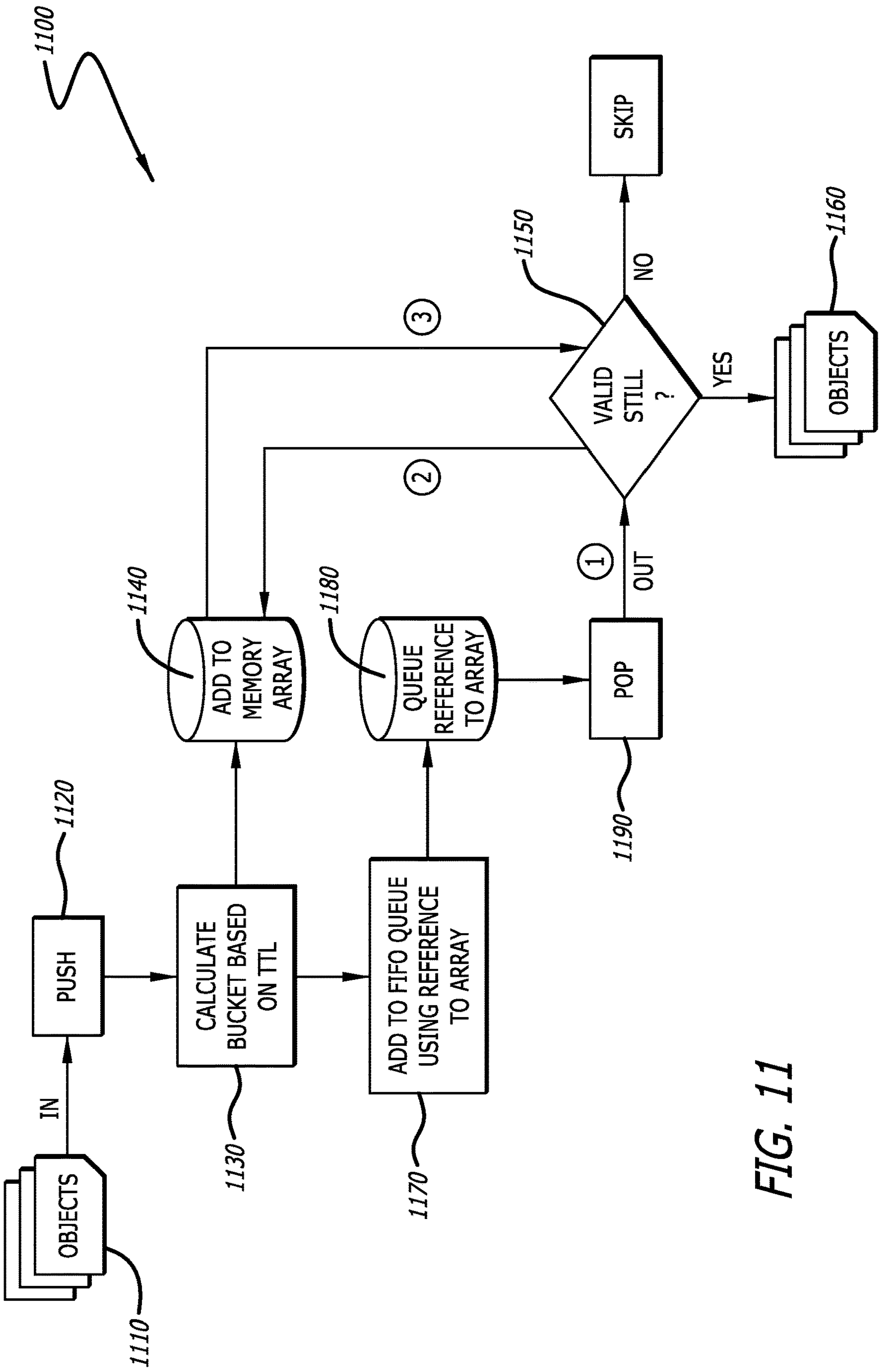
FIG. 11 is a conceptual flow diagram of a process for enqueuing and dequeuing one or more objects being in a time-based queue, in accordance with various embodiments of the disclosure.

Referring to FIG. 11, a conceptual flow diagram of a process 1100 for enqueueing and dequeuing one or more objects in the time-based queue, in accordance with various embodiments of the disclosure is shown. In many embodiments, the process 1100 can receive the object stream including the objects (block 1110). In some embodiments, the objects may be data packets, messages, or any digital content, for example.

In a number of embodiments, the process 1100 may insert the object in the time-based queue (block 1120). In some embodiments, the process 1100 can determine the maximum TTL value for the object stream. In certain embodiments, the process 1100 may create the time-based queue based on the maximum TTL value. In more embodiments, the process 1100 can assign the TTL value to the object and insert the object in the time-based queue.

In various embodiments, the process 1100 can calculate the bucket array based on the TTL of the object or the maximum TTL value (block 1130). In some embodiments, the process 1100 may calculate a bucket within the bucket array for storing the object. In certain embodiments, the process 1100 may store the object in the determined bucket.

In additional embodiments, the process 1100 may add the object in the memory array (block 1140). In some embodiments, the objects stored in the bucket array may be indexed based on the TTL values of the objects in the bucket array. In certain embodiments, for example, the bucket array may be the data structure that utilizes the TTL values as key values that are utilized to create buckets that can store the objects having those TTL values. In more examples, the objects having same TTL values may be stored in same bucket. In some more examples, the objects expiring at same time may be stored in the same bucket.

In further embodiments, the process 1100 can check if the object is still valid (block 1150). In some embodiments, the process 1100 may actively or dynamically manage the time-based queue. In certain embodiments, the process 1100 can check the TTL values of the objects in the time-based queue. In more embodiments, the process 1100 may identify one or more objects for which the time periods indicated by corresponding TTL values have elapsed.

In many more embodiments, if the process 1100 decides at block 1150 that the object is valid, the process 1100 may maintain the objects in the time-based queue (block 1160). In some embodiments, if the process 1100 decides at block 1150 that the object is not valid, the process 1100 may remove or skip the object. In certain embodiments, removing the invalid objects from the time-based queue may prevent buffer bloating and buildup of obsolete data in the time-based queue.

In many additional embodiments, the process 1100 can add the time-based queue utilizing the references to the bucket array (block 1170). In some embodiments, the process 1100 stores the bucket array in the time-based storage and can store the references to the bucket array in the time-based queue in the memory. In certain embodiments, the time-based queue may be the time-based FIFO queue.

In further embodiments, the process 1100 may queue references to the bucket array (block 1180). In some embodiments, the time-based queue including the references to the objects may be stored in the memory separate from the time-based storage. In certain embodiments, the bucket array including the objects can be stored in the time-based storage. In more embodiments, the references in the time-based queue may be memory pointers that point to one or more memory locations in the time-based storage where the bucket array is stored.

In many more embodiments, the process 1100 can pop the objects out of the time-based queue (block 1190). In some embodiments, the process 1100 may remove the object from the time-based queue when the time period indicated by the TTL value elapses after the object insertion time. In certain embodiments, the process 1100 can pop the objects from the time-based queue based on the FIFO order. In more embodiments, the process 1100 may pop the objects from the time-based queue based on the FIFO order, TTL values of the objects, priorities of the objects, priority of the time-based queue, or any combination of these factors.

In many additional embodiments, in operation, the time-based FIFO queue may be configured as an index queue (or a queue of references) to the time-based storage location. To that end, the index queue may be configured as a data structure that efficiently manages a collection of elements in a sequential order, like a regular queue. However, what distinguishes an index queue is its ability to retrieve elements by their index position, in addition to the typical enqueue and dequeue operations. Each element in the index queue may be assigned a unique index, allowing for direct access to any element without the need to traverse the entire queue. This provides fast retrieval of elements, making it useful in scenarios where random access or positional information is crucial. The index queue maintains the integrity of the indices by automatically adjusting them when elements are inserted or removed, ensuring consistent and accurate indexing throughout the index queue's lifespan. Inserting the objects requires updating both the storage and FIFO queue. The pop operation pulls from the time-based FIFO queue to obtain the reference of the stored memory object. If the object is too old, it may be skipped and the next one may be provided.

In many further embodiments, in operation, the time-based queue may perform at rates of over 200 million push/enqueue per second and over 400 million pop/dequeue per second. In some embodiments, the performance may be programming language specific. In C++, for example, to obtain the time using chrono/gettimeofday it may take roughly 10 ns per operation. Several other programming languages may be utilized as alternatives, without limitation. Each language has its own strengths and areas of specialization, so selecting the appropriate one depends on factors such as performance, community support, and project requirements. In certain embodiments, a dedicated thread to count time ticks may be implemented.

Although a specific embodiment for the process 1100 to enqueue and dequeue the objects in the time-based queue is described above with respect to FIG. 11, any of a variety of systems and/or processes may be utilized in accordance with embodiments of the disclosure. For example, the process 1100 may actively monitor the time-based queue and the objects in the time-based queue. The aspects described in FIG. 11 may also be interchangeable with other elements of FIGS. 1-10 and FIG. 12 as required to realize a particularly desired embodiment.

Figure 12:
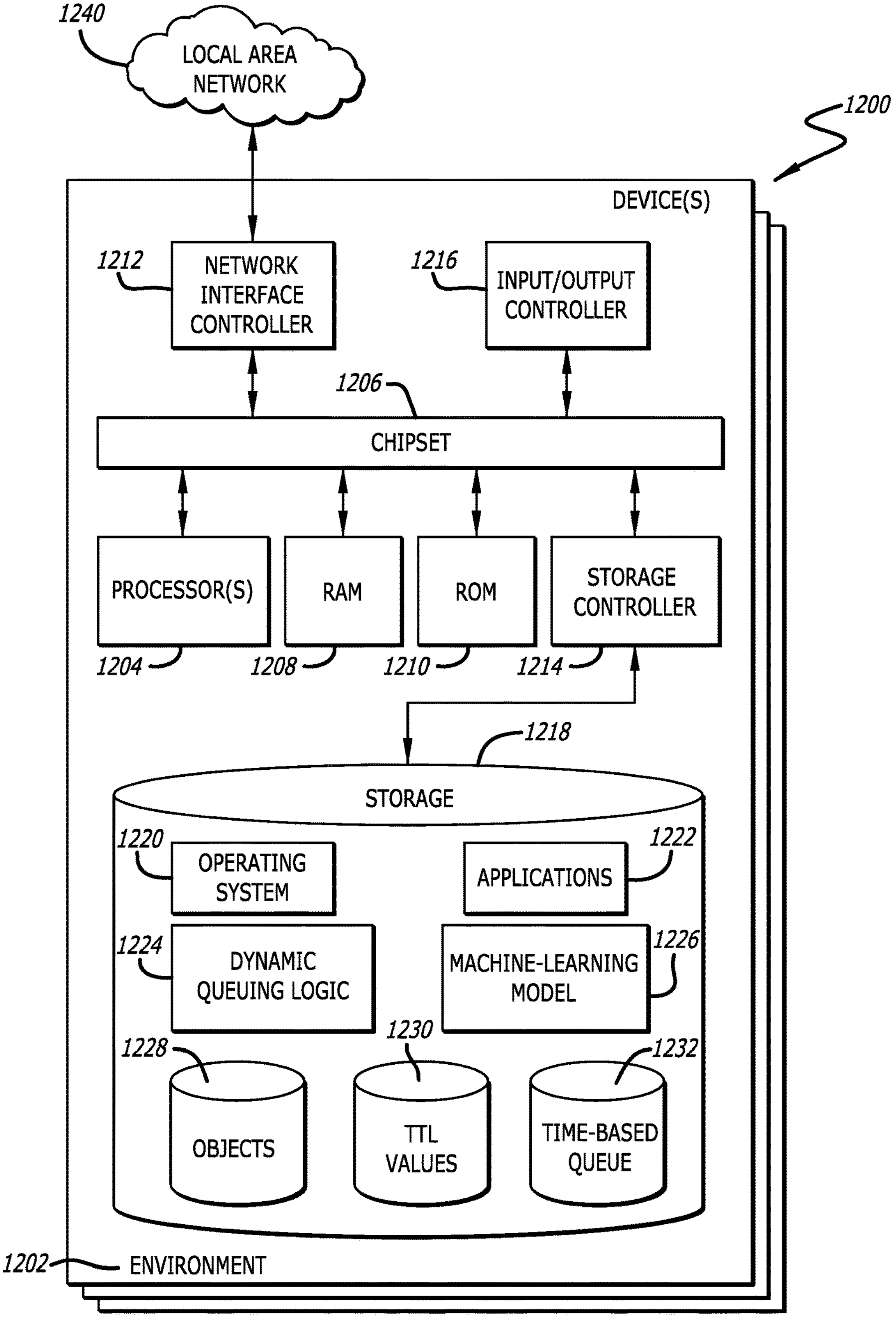
FIG. 12 is a conceptual block diagram of a device suitable for configuration with a dynamic queuing logic, in accordance with various embodiments of the disclosure.

Referring to FIG. 12, a conceptual block diagram of a device 1200 suitable for configuration with a dynamic queuing logic, in accordance with various embodiments of the disclosure is shown. The embodiment of the conceptual block diagram depicted in FIG. 12 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 12 can also illustrate an access point, a switch, or a router in accordance with various embodiments of the disclosure. The device 1200 may, in many non-limiting examples, correspond to physical devices or to virtual resources described herein.

In many embodiments, the device 1200 may include an environment 1202 such as a baseboard or "motherboard," in physical embodiments that can be configured as a printed circuit board with a multitude of components or devices connected by way of a system bus or other electrical communication paths. Conceptually, in virtualized embodiments, the environment 1202 may be a virtual environment that encompasses and executes the remaining components and resources of the device 1200. In more embodiments, one or more processors 1204, such as, but not limited to, central processing units ("CPUs") can be configured to operate in conjunction with a chipset 1206. The processor(s) 1204 can be standard programmable CPUs that perform arithmetic and logical operations necessary for the operation of the device 1200.

In a number of embodiments, the processor(s) 1204 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1206 may provide an interface between the processor(s) 1204 and the remainder of the components and devices within the environment 1202. The chipset 1206 can provide an interface to a random-access memory ("RAM") 1208, which can be used as the main memory in the device 1200 in some embodiments. The chipset 1206 can further be configured to provide an interface to a computer-readable storage medium such as a read-only memory ("ROM") 1210 or non-volatile RAM ("NVRAM") for storing basic routines that can help with various tasks such as, but not limited to, starting up the device 1200 and/or transferring information between the various components and devices. The ROM 1210 or NVRAM can also store other application components necessary for the operation of the device 1200 in accordance with various embodiments described herein.

Additional embodiments of the device 1200 can be configured to operate in a networked environment using logical connections to remote computing devices and computer systems through a network, such as the network 1240. The chipset 1206 can include functionality for providing network connectivity through a network interface card ("NIC") 1212, which may comprise a gigabit Ethernet adapter or similar component. The NIC 1212 can be capable of connecting the device 1200 to other devices over the network 1240. It is contemplated that multiple NICs 1212 may be present in the device 1200, connecting the device to other types of networks and remote systems.

In further embodiments, the device 1200 can be connected to a storage 1218 that provides non-volatile storage for data accessible by the device 1200. The storage 1218 can, for instance, store an operating system 1220, applications 1222, objects 1228, TTL values 1230, and time-based queue 1232 which are described in greater detail below. The storage 1218 can be connected to the environment 1202 through a storage controller 1214 connected to the chipset 1206. In certain embodiments, the storage 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The objects 1228 may be messages, data packets, or any digital content. The TTL values 1230 can be the lifespans for which the objects 1228 remain in the time-based queue 1232. The time-based queue 1232 may include references to the memory locations in the time-based storage that stores the objects 1228.

The device 1200 can store data within the storage 1218 by transforming the physical state of the physical storage units to reflect the information being stored. The specific transformation of physical state can depend on various factors. Examples of such factors can include, but are not limited to, the technology used to implement the physical storage units, whether the storage 1218 is characterized as primary or secondary storage, and the like.

In many more embodiments, the device 1200 can store information within the storage 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1200 can further read or access information from the storage 1218 by detecting the physical states or characteristics of one or more particular locations within the physical storage units.

In addition to the storage 1218 described above, the device 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1200. In some examples, the operations performed by a cloud computing network, and or any components included therein, may be supported by one or more devices similar to device 1200. Stated otherwise, some or all of the operations performed by the cloud computing network, and or any components included therein, may be performed by one or more devices 1200 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1218 can store an operating system 1220 utilized to control the operation of the device 1200. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1218 can store other system or application programs and data utilized by the device 1200.

In many additional embodiments, the storage 1218 or other computer-readable storage media is encoded with computer-executable instructions which, when loaded into the device 1200, may transform it from a general-purpose computing system into a special-purpose computer capable of implementing the embodiments described herein. These computer-executable instructions may be stored as application 1222 and transform the device 1200 by specifying how the processor(s) 1204 can transition between states, as described above. In some embodiments, the device 1200 has access to computer-readable storage media storing computer-executable instructions which, when executed by the device 1200, perform the various processes described above with regard to FIGS. 1-11. In certain embodiments, the device 1200 can also include computer-readable storage media having instructions stored thereupon for performing any of the other computer-implemented operations described herein.

In many further embodiments, the device 1200 may include a dynamic queuing logic 1224. The dynamic queuing logic 1224 can be configured to perform one or more of the various steps, processes, operations, and/or other methods that are described above. Often, the dynamic queuing logic 1224 can be a set of instructions stored within a non-volatile memory that, when executed by the processor(s)/controller(s) 1204 can carry out these steps, etc. In some embodiments, the dynamic queuing logic 1224 may be a client application that resides on a network-connected device, such as, but not limited to, a server, switch, personal or mobile computing device in a single or distributed arrangement. The dynamic queuing logic 1224 can create and maintain the time-based queue 1232.

In still further embodiments, the device 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can be configured to provide output to a display, such as a computer monitor, a flat panel display, a digital projector, a printer, or other type of output device. Those skilled in the art will recognize that the device 1200 might not include all of the components shown in FIG. 12 and can include other components that are not explicitly shown in FIG. 12 or might utilize an architecture completely different than that shown in FIG. 12.

As described above, the device 1200 may support a virtualization layer, such as one or more virtual resources executing on the device 1200. In some examples, the virtualization layer may be supported by a hypervisor that provides one or more virtual machines running on the device 1200 to perform functions described herein. The virtualization layer may generally support a virtual resource that performs at least a portion of the techniques described herein.

Finally, in numerous additional embodiments, data may be processed into a format usable by a machine-learning model 1226 (e.g., feature vectors), and or other pre-processing techniques. The machine-learning ("ML") model 1226 may be any type of ML model, such as supervised models, reinforcement models, and/or unsupervised models. The ML model 1226 may include one or more of linear regression models, logistic regression models, decision trees, Naïve Bayes models, neural networks, k-means cluster models, random forest models, and/or other types of ML models 1226.

The ML model(s) 1226 can be configured to generate inferences to make predictions or draw conclusions from data. An inference can be considered the output of a process of applying a model to new data. This can occur by learning from at least the objects 1228, the TTL values 1230, and the time-based queue 1232 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1226 may be generated by human/administrator verifications or may compare predicted outcomes with actual outcomes.

Although a specific embodiment for a device suitable for configuration with a network optimization logic for carrying out the various steps, processes, methods, and operations described herein is discussed with respect to FIG. 12, any of a variety of systems and/or processes may be utilized in accordance with embodiments of the disclosure. For example, the device 1200 may be in a virtual environment such as a cloud-based network administration suite, or it may be distributed across a variety of network devices or switches. The elements depicted in FIG. 12 may also be interchangeable with other elements of FIGS. 1-11 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
a memory communicatively coupled to the processor; and
a dynamic queuing logic, configured to:
receive an object stream comprising a plurality of network data objects;
determine a maximum Time-To-Live (TTL) value for the object stream based on a priority of the object stream, wherein the maximum TTL value comprises a maximum lifespan that the object stream can have;
generate a time-based queue based on the maximum TTL value;
assign a first TTL value for a first network data object of the plurality of network data objects based on a requirement of an application that utilizes the first network data object; and insert the first network data object into the time-based queue.

2. The device of claim 1, wherein the dynamic queuing logic is further configured to determine a first object insertion time.

3. The device of claim 2, wherein the insertion of the first object occurs at the first object insertion time.

4. The device of claim 3, wherein the first TTL value is indicative of a first time period.

5. The device of claim 4, wherein the dynamic queuing logic is further configured to remove the first object from the time-based queue when the first time period has elapsed after the first object insertion time.

6. The device of claim 5, wherein the dynamic queuing logic is further configured to:

determine a second TTL value corresponding to a second object of the plurality of objects stored in the time-based queue;

determine a second time period indicated by the second TTL value;

determine a second object insertion time corresponding to the second object; and remove the second object from the time-based queue when the second time period has elapsed after the second object insertion time.

7. The device of claim 1, wherein the dynamic queuing logic is further configured to:

detect a latency spike in reception of the object stream;

determine a recovery time period based on the latency spike;

determine one or more objects of the plurality of objects having one or more TTL values within the recovery time period; and maintain the one or more objects of the plurality of objects in the time-based queue during the recovery time period.

8. The device of claim 7, wherein the dynamic queuing logic is further configured to retrieve the plurality of objects from the time-based queue based on a First-In-First-Out (FIFO) order and a plurality of TTL values corresponding to the plurality of objects.

9. The device of claim 8, wherein the dynamic queuing logic is further configured to:

determine a queue size based on the maximum TTL value;

generate the time-based queue based on the queue size; and store the time-based queue in the memory.

10. The device of claim 9, wherein the time-based queue stores a plurality of references corresponding to the plurality of objects.

11. The device of claim 10, wherein the plurality of references correspond to a plurality of memory locations in the memory.

12. The device of claim 11, wherein the plurality of objects are stored in the plurality of memory locations in a bucket array.

13. The device of claim 12, wherein the bucket array is indexed based on the plurality of TTL values.

14. The device of claim 13, wherein the dynamic queuing logic is further configured to dynamically modify one or more TTL values of the plurality of TTL values corresponding to one or more objects of the plurality of objects stored in the time-based queue.

15. The device of claim 1, wherein the dynamic queuing logic is further configured to dynamically modify the maximum TTL value.

16. A device, comprising:

a processor;

a memory communicatively coupled to the processor; and a dynamic queuing logic, configured to:

receive an object stream comprising a plurality of network data objects;

determine a maximum Time-To-Live (TTL) value for the object stream based on a priority of the object stream, wherein the maximum TTL value comprises a maximum lifespan that the object stream can have;

generate a time-based queue based on the maximum TTL value;

assign a plurality of TTL values for the plurality of network data objects based on a requirement of an application that utilizes the first network data object; and insert the plurality of network data objects into the time-based queue.

17. The device of claim 16, wherein the dynamic queuing logic is further configured to:

determine a plurality of time periods corresponding to the plurality of TTL values; and remove one or more objects of the plurality of objects from the time-based queue based on one or more time periods of the plurality of time periods.

18. The device of claim 17, wherein the dynamic queuing logic is further configured to:

detect a latency spike in reception of the object stream;

determine a recovery time period based on the latency spike;

determine the one or more objects of the plurality of objects having one or more TTL values of the plurality of TTL values within the recovery time period; and maintain the one or more objects of the plurality of objects in the time-based queue during the recovery time period.

19. A method, comprising:

receiving an object stream comprising a plurality of network data objects;

determining a maximum Time-To-Live (TTL) value for the object stream based on a priority of the object stream, wherein the maximum TTL value comprises a maximum lifespan that the object stream can have;

generating a time-based queue based on the maximum TTL value;

assigning a plurality of TTL values for the plurality of network data objects based on a requirement of an application that utilizes the first network data object; and inserting the plurality of network data objects into the time-based queue.

20. The method of claim 19, further comprising:

determining a plurality of time periods corresponding to the plurality of TTL values; and removing one or more objects of the plurality of objects from the time-based queue based on one or more time periods of the plurality of time periods.

* * * * *